(12) United States Patent
Schoultz et al.

(10) Patent No.: US 8,939,445 B2
(45) Date of Patent: Jan. 27, 2015

(54) VACUUM ROLL WITH INTERNAL ROTARY VALVE

(71) Applicant: Kimberly-Clark Worldwide, Inc., Neenah, WI (US)

(72) Inventors: Adam Nicholas Schoultz, Neenah, WI (US); Steven Todd Moore, Appleton, WI (US); Joseph John Sina, Appleton, WI (US); Charles Robert Sample, Green Bay, WI (US); Gerald Keith Sosalla, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 36 days.

(21) Appl. No.: 13/905,802

(22) Filed: May 30, 2013

(65) Prior Publication Data

US 2014/0353123 A1     Dec. 4, 2014

(51) Int. Cl.
*B65H 20/12*     (2006.01)
*B65G 39/02*     (2006.01)

(52) U.S. Cl.
CPC ..................................... *B65G 39/02* (2013.01)
USPC .......... 271/108; 271/3.22; 198/780; 198/782; 198/783; 193/37; 162/367; 162/368; 162/369; 162/370

(58) Field of Classification Search
USPC ...................... 271/3.22, 91, 92, 98, 107, 108; 198/780, 782, 783; 193/37; 162/367, 162/368, 369, 370
See application file for complete search history.

(56) References Cited

U.S. PATENT DOCUMENTS

| 2,969,837 | A | | 1/1961 | Reynar |
| 3,037,557 | A | | 6/1962 | Faeber et al. |
| 3,142,428 | A | | 7/1964 | Faeber |
| 3,372,924 | A | * | 3/1968 | Treff ............................... 271/96 |
| 3,533,618 | A | | 10/1970 | Carstens |
| 3,669,064 | A | | 6/1972 | Hoelzinger et al. |
| 4,053,150 | A | | 10/1977 | Lane |
| 4,260,146 | A | * | 4/1981 | Mitzel ............................. 271/94 |
| 4,320,893 | A | * | 3/1982 | Blumle ........................... 271/94 |
| 4,466,605 | A | * | 8/1984 | Leuthold et al. .............. 271/177 |
| 4,479,573 | A | | 10/1984 | Ackley et al. |
| 4,519,596 | A | | 5/1985 | Johnson et al. |
| 4,650,173 | A | | 3/1987 | Johnson et al. |
| 4,681,215 | A | | 7/1987 | Martin |
| 4,693,784 | A | | 9/1987 | Aula et al. |
| 4,706,863 | A | | 11/1987 | Hirakawa et al. |
| 4,773,522 | A | | 9/1988 | Lenhart |
| 5,031,338 | A | | 7/1991 | Wedel |
| 5,137,758 | A | | 8/1992 | Kistner et al. |

(Continued)

FOREIGN PATENT DOCUMENTS

DE     92 05 154 U1     6/1992
WO     WO 90/02840 A1     3/1990

(Continued)

*Primary Examiner* — Douglas Hess
(74) *Attorney, Agent, or Firm* — Kimberly-Clark Worldwide, Inc.

(57) ABSTRACT

A vacuum roll includes an inner rotor, an intermediate stator, and an outer shell roll. The inner rotor has open and closed portions and is adapted to rotate within the intermediate stator which is rotationally fixed and also has open and closed portions. The outer shell roll has open and closed portions and is adapted to move around the intermediate stator. Together the inner rotor and the intermediate stator define an internal rotary valve interface adapted to control fluid communication between the interior chamber and the outer shell.

17 Claims, 23 Drawing Sheets

(56) References Cited

U.S. PATENT DOCUMENTS

| | | | |
|---|---|---|---|
| 5,205,398 A | 4/1993 | Hart et al. | |
| 5,224,405 A | 7/1993 | Pohjola | |
| 5,276,464 A * | 1/1994 | Kerr et al. | 346/134 |
| 5,323,180 A * | 6/1994 | Kuberka et al. | 347/215 |
| 5,405,487 A * | 4/1995 | Galchefski et al. | 156/566 |
| 5,524,740 A | 6/1996 | Conley | |
| 5,871,433 A * | 2/1999 | Lehmann et al. | 493/420 |
| 6,131,214 A | 10/2000 | Moenning et al. | |
| 6,247,861 B1 | 6/2001 | Wotton | |
| 6,254,082 B1 * | 7/2001 | Sugimoto et al. | 271/108 |
| 6,264,743 B1 | 7/2001 | Cucuzza | |
| 6,350,223 B1 | 2/2002 | Niedermeyer | |
| 6,488,194 B1 | 12/2002 | Couturier | |
| 6,520,496 B2 * | 2/2003 | Muller et al. | 270/52.01 |
| 6,585,139 B1 | 7/2003 | Holtmann et al. | |
| 6,630,096 B2 | 10/2003 | Venturino et al. | |
| 6,672,065 B1 * | 1/2004 | Choroszylow et al. | 60/726 |
| 6,673,506 B2 * | 1/2004 | Nakanishi et al. | 430/137.18 |
| 6,739,489 B1 | 5/2004 | Nicolai et al. | |
| 6,811,019 B2 | 11/2004 | Christian et al. | |
| 6,936,105 B2 | 8/2005 | De Vroome | |
| 7,001,162 B2 * | 2/2006 | Choroszylow et al. | 418/61.2 |
| 7,239,056 B1 * | 7/2007 | Griggs et al. | 310/87 |
| 7,367,264 B2 | 5/2008 | Beaudry | |
| 7,399,266 B2 | 7/2008 | Aiolfi et al. | |
| 7,448,118 B2 * | 11/2008 | Munstermann | 28/104 |
| 7,807,024 B2 * | 10/2010 | Clarke et al. | 162/283 |
| 7,846,082 B2 | 12/2010 | Burns, Jr. et al. | |
| 8,007,425 B2 * | 8/2011 | Scheu | 492/8 |
| 8,025,285 B2 * | 9/2011 | Hiramitsu et al. | 271/96 |
| 8,029,430 B2 | 10/2011 | Neubauer et al. | |
| 8,056,702 B2 * | 11/2011 | Sugahara | 198/468.9 |
| 8,122,846 B2 * | 2/2012 | Stiblert et al. | 118/300 |
| 8,257,237 B2 | 9/2012 | Burns et al. | |
| 8,276,638 B2 * | 10/2012 | Yamamoto | 156/519 |
| 2002/0129687 A1 | 9/2002 | Eckstein et al. | |
| 2002/0140151 A1 | 10/2002 | Couturier | |
| 2003/0042660 A1 | 3/2003 | Venturino et al. | |
| 2003/0134559 A1 | 7/2003 | Delzer et al. | |
| 2004/0176231 A1 | 9/2004 | Pajunen | |
| 2004/0250706 A1 | 12/2004 | De Matteis | |
| 2005/0073089 A1 | 4/2005 | White | |
| 2005/0073090 A1 | 4/2005 | White | |
| 2008/0176729 A1 | 7/2008 | Anelli et al. | |
| 2011/0003673 A1 | 1/2011 | Piantoni et al. | |
| 2012/0152695 A1 | 6/2012 | Coenen et al. | |
| 2012/0157284 A1 | 6/2012 | Coenen et al. | |
| 2012/0157286 A1 | 6/2012 | Coenen et al. | |
| 2012/0157288 A1 | 6/2012 | Coenen et al. | |

FOREIGN PATENT DOCUMENTS

| | | |
|---|---|---|
| WO | WO 90/02841 A1 | 3/1990 |
| WO | WO 2009/083788 A1 | 7/2009 |

* cited by examiner

VACUUM ROLL WITH INTERNAL ROTARY VALVE

BACKGROUND OF THE INVENTION

The field of the present invention relates generally to vacuum rolls, and more particularly to vacuum rolls for holding, controlling, transferring, folding, winding or otherwise handling flexible materials.

One known type of vacuum roll includes a rotatable outer cylindrical wall defining an interior space and a plurality of apertures extending through the cylindrical wall and in fluid communication with the interior space. One or more stationary vacuum manifolds are disposed within the interior space and operatively connected to a vacuum source. Vacuum can be selectively applied to one or more of the vacuum manifolds by operating the vacuum source.

In another known type of vacuum roll, each of the vacuum manifolds is rotatable with the outer cylindrical wall. For example, a first plurality of apertures in the cylindrical wall is in fluid communication with one of the manifolds and a second plurality of apertures in the cylindrical wall is in fluid communication with another one of the manifolds. Vacuum can be selectively applied to the first plurality of apertures and/or the second plurality of apertures at any location about the rotation of the outer cylinder by regulating the vacuum applied by the vacuum source to the respective manifold. Regulation of the vacuum source is most commonly performed using one or more valves (e.g., solenoid valves). In other words, the vacuum applied to each of the manifolds can be selectively turned "on" and "off" by opening and closing a valve.

However, there remains a need for a vacuum roll capable of changing its vacuum profile even while the vacuum roll is handling a material at a high line speed.

SUMMARY OF THE INVENTION

In one aspect, the present invention provides a vacuum roll having an inner rotor, an intermediate stator, and an outer shell roll. The inner rotor is adapted to rotate around a first axis and defines an interior chamber, an open portion, and a closed portion, in the circumferential direction. The intermediate stator is rotationally fixed (i.e., does not rotate), has a second axis and surrounds the inner rotor. The intermediate stator defines an open portion and a closed portion in the circumferential direction. The outer shell roll is adapted to move about a third axis and surrounds the intermediate stator. The outer shell roll defines an open portion and a closed portion in the circumferential direction. Together the inner rotor and the intermediate stator define an internal rotary valve interface adapted to control fluid communication between the interior chamber and the outer shell.

In some embodiments, the inner rotor, the intermediate stator, and the outer shell roll are concentric and have a common axis.

In some embodiments, the open portion of the intermediate stator defines a first open portion and a second open portion in the circumferential direction. The first open portion is adapted for fluid isolation from the second open portion. In various embodiments, the open portion of the inner rotor may include a plurality of sub-openings extending in the axial direction. The first open portion of the intermediate stator may include a plurality of sub-openings extending in the axial direction. The second open portion of the intermediate stator may include a plurality of sub-openings extending in the axial direction. The open portion of the outer shell roll may include a plurality of sub-openings extending in the axial direction. In some embodiments, a single inner rotor sub-opening may be aligned, in the axial direction, with a single sub-opening of the first open portion of the intermediate stator, a single sub-opening of the second open portion of the intermediate stator, and a pair of sub-openings of the outer shell roll.

In some embodiments, the first open portion of the intermediate stator may be separated from the second open portion of the intermediate stator, in the circumferential direction, by a divider that includes a positive pressure blow off.

In some embodiments, the intermediate stator defines an internal surface and an external surface. The closed portion defines an internal surface closed percentage and an external surface closed percentage that is less than the internal surface closed percentage.

In some embodiments, the inner rotor is connected with a first drive mechanism for rotating the inner rotor at a constant velocity and the outer shell roll is connected with a second drive mechanism. The second drive mechanism is different than the first drive mechanism and is adapted to co-rotate, counter-rotate, or oscillate the outer shell roll with respect to the inner rotor rotation.

In some embodiments, the inner rotor is connected with a drive mechanism for rotating the inner rotor at a non-constant velocity.

In some embodiments, the radial clearance between the outer shell roll and the intermediate stator is less than 0.010 inch and the radial clearance between the intermediate stator and the outer shell roll is less than 0.010 inch.

In some embodiments, the interior chamber is connected to a vacuum source ported in a radial direction relative to the first axis.

In another aspect, the present invention provides a method for creating a circumferential vacuum profile in a vacuum roll. The method includes providing a vacuum roll having an inner rotor, an intermediate stator, and an outer shell roll. The inner rotor is adapted to rotate about a first axis, defines an interior chamber and also defines an open portion and a closed portion in the circumferential direction. The intermediate stator is rotationally fixed and has a second axis, surrounds the inner rotor, and defines an open portion and a closed portion in the circumferential direction. The outer shell roll is adapted to move about a third axis, surrounds the intermediate stator, and defines an open portion and a closed portion in the circumferential direction. The method includes applying vacuum to the interior chamber. The method also includes communicating vacuum from the interior chamber to the open portion of the outer shell roll by moving the outer shell roll around the intermediate stator to at least partially align the open portion of the outer shell roll with the open portion of the intermediate stator while also rotating the inner rotor within the intermediate stator to at least partially align the open portion of the inner rotor with the open portion of the intermediate stator. The method also includes blocking vacuum from the interior chamber to the open portion of the outer shell roll by rotating the inner rotor within the intermediate stator to completely align the closed portion of the inner rotor with the open portion of the intermediate stator or rotating the outer shell roll around the intermediate stator to completely align the open portion of the outer shell roll with the closed portion of the intermediate stator.

In some embodiments, the open portion of the intermediate stator defines a first open portion and a second open portion in the circumferential direction and the method includes applying vacuum to the first open portion of the intermediate stator, applying vacuum to the second open portion of the intermediate stator while continuing to apply vacuum to the first open portion of the intermediate stator, and blocking vacuum to the first open portion of the intermediate stator while simultaneously applying fluid pressure to the first open portion of the intermediate stator and simultaneously applying vacuum to the second open portion of the intermediate stator.

In some embodiments, the method further includes oscillating the outer shell roll by alternatingly and repetitively moving the outer shell roll in a first direction and a second direction, wherein the first direction is opposite the second direction.

In some embodiments, the method further includes applying vacuum to the open portion of the outer shell roll in a first position while moving in the first direction and blocking vacuum to the open portion of the outer shell roll in the first position while moving in the second direction.

In another aspect, the present invention provides a method for creating a circumferential vacuum profile in a vacuum roll. The method includes providing a vacuum roll having an inner rotor, an intermediate stator, and an outer shell roll. The inner rotor rotates about a common axis, defines an interior chamber and also defines an open portion and a closed portion in the circumferential direction. The intermediate stator is rotationally fixed about the common axis, surrounds the inner rotor, and defines a first open portion, a second open portion, and a closed portion in the circumferential direction. The outer shell roll rotates about the common axis, surrounds the intermediate stator, and defines an open portion and a closed portion in the circumferential direction. The method further includes applying vacuum to the interior chamber. The method also includes communicating vacuum from the interior chamber to the first open portion of the intermediate stator by rotating the inner rotor within the intermediate stator to at least partially align the open portion of the inner rotor with the first open portion of the intermediate stator to define a first valve ON condition. The method also includes blocking vacuum from the interior chamber to the first open portion of the intermediate stator by rotating the inner rotor within the intermediate stator to completely align the closed portion of the inner rotor with the first open portion of the intermediate stator to define a first valve OFF condition. The method further includes communicating vacuum from the interior chamber to the second open portion of the intermediate stator by rotating the inner rotor within the intermediate stator to at least partially align the open portion of the inner rotor with the second open portion of the intermediate stator to define a second valve ON condition. The method further includes blocking vacuum from the interior chamber to the second open portion of the intermediate stator by rotating the inner rotor within the intermediate stator to completely align the closed portion of the inner rotor with the second open portion of the intermediate stator to define a second valve OFF condition. The method also includes blocking vacuum from the interior chamber to the open portion of the outer shell roll by completely aligning the open portion of the outer shell roll with the closed portion of the intermediate stator to define a first shell position. The method also includes communicating vacuum from the interior chamber to the open portion of the outer shell roll by moving the outer shell roll around the intermediate stator in a first direction to at least partially align the open portion of the outer shell roll with the first open portion of the intermediate stator to define a second shell position while in the first valve ON condition. The method also includes communicating vacuum from the interior chamber to the open portion of the outer shell roll by moving the outer shell roll around the intermediate stator in the first direction to at least partially align the open portion of the outer shell roll with the second open portion of the intermediate stator to define a third shell position while in the second valve ON condition. The method also includes communicating vacuum from the interior chamber to the open portion of the outer shell roll by moving the outer shell roll around the intermediate stator in a second direction, opposite the first direction, to the third shell position while in the second valve ON condition. The method also includes the step of blocking vacuum from the interior chamber to the open portion of the outer shell roll by moving the outer shell roll around the intermediate stator in the second direction to the second shell position while in the first valve OFF condition.

In various embodiments, the method further includes applying fluid pressure to the first open portion of the intermediate stator while in the first valve OFF condition and while in the second valve ON condition.

DETAILED DESCRIPTION OF THE DRAWINGS

Figure 1:
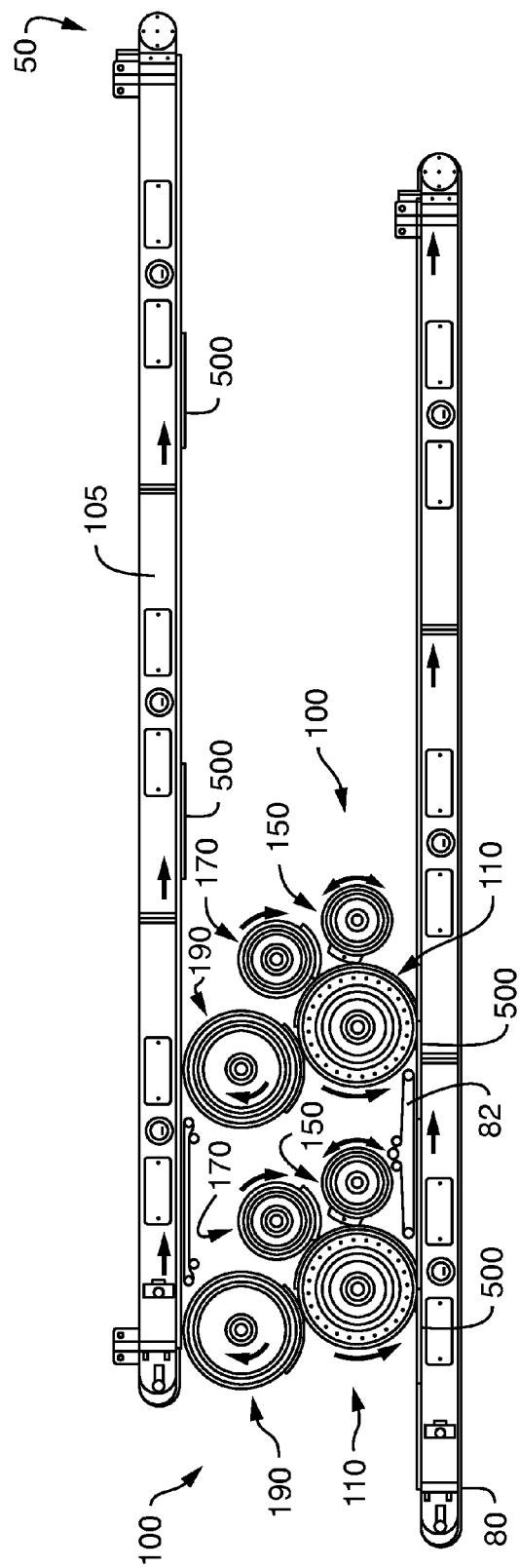
FIG. 1 is a schematic view of a portion of an exemplary product manufacturing system having two folding apparatus.

FIG. 1 is a schematic view of a portion of an exemplary manufacturing system, indicated generally at 50, for manufacturing products (such as personal care products) having two folding apparatuses, indicated generally at 100. The illustrated configuration of the manufacturing system 50 has two folding apparatuses 100 but it is contemplated that the system could have fewer (i.e., one) or more folding apparatus. The folding apparatuses 100 are capable of maintaining accurate control of the product while it is being folded at high line speeds. As a result, the products being manufactured by the illustrated system 50 are folded more precisely, with greater repeatability, and with less force (and thus less product damage and deformation) than prior art folding apparatus, such as blade folding apparatus. As used herein, the term "high line speed" refers to product manufacturing rates of 400 products per minute (ppm) or greater, such as 400 ppm to 4000 ppm, or 600 ppm to 3000 ppm, or 900 ppm to 1500 ppm. However, it is understood that the product manufacturing rate is directly dependent on the product begin manufactured. Thus, the term "high line speed" is relative and can differ from one product to another.

For exemplary purposes only, the illustrated manufacturing system 50 and thus, the folding apparatus 100 will be described herein as used with a disposable training pant manufacturing system. It is understood, however, that the manufacturing system 50 and folding apparatus 100 can be configured to manufacture and fold numerous other products, including but not limited to, other types of personal care products, foil products, film products, woven products, packaging products, industrial products, food products, and the like, whether disposable or non-disposable, and whether absorbent or non-absorbent, without departing from the scope of the invention. Other suitable personal care products that could be manufactured by the system 50 and folded by the folding apparatus 100 include, but are not limited to, diapers, adult incontinence garments, panty liners, and feminine pads.

As illustrated in FIG. 1, a plurality of discrete training pants 500 are fed along a first conveying member, indicated generally at 80. The first conveying member 80 delivers each of the training pants 500 (generally, "a product") in a pre-folded configuration to one of the two folding apparatus 100 for folding the training pants from a pre-folded configuration to a folded configuration. The folded training pants 500 are conveyed from the respective folding apparatus 100 by a second conveying member, indicated generally at 105, to other components (not shown) of the system 50. Since both of the folding apparatus 100 illustrated in FIG. 1 are substantially the same, the detailed description of only one is provided herein.

In the embodiment illustrated in FIG. 1, half of the training pants 500 are delivered to each of the folding apparatus 100. Devices suitable for use as the first conveying member 80 are well known in the art and include, but are not limited to, drums, rollers, belt conveyors, air conveyors, vacuum conveyors, chutes, and the like. For exemplary purposes, the first conveying member 80 is illustrated herein as a vacuum belt conveyor. In some embodiments, the first conveying member 80 may include a conveying-assist device 82 to assist in keeping the training pants in a controlled position during advancement as illustrated in FIG. 1. Conveying-assist means are well-known in the art and, for example, include support belts, vacuum means, support rolls, secondary conveyor belts, guide plates, and the like.

Figure 2:
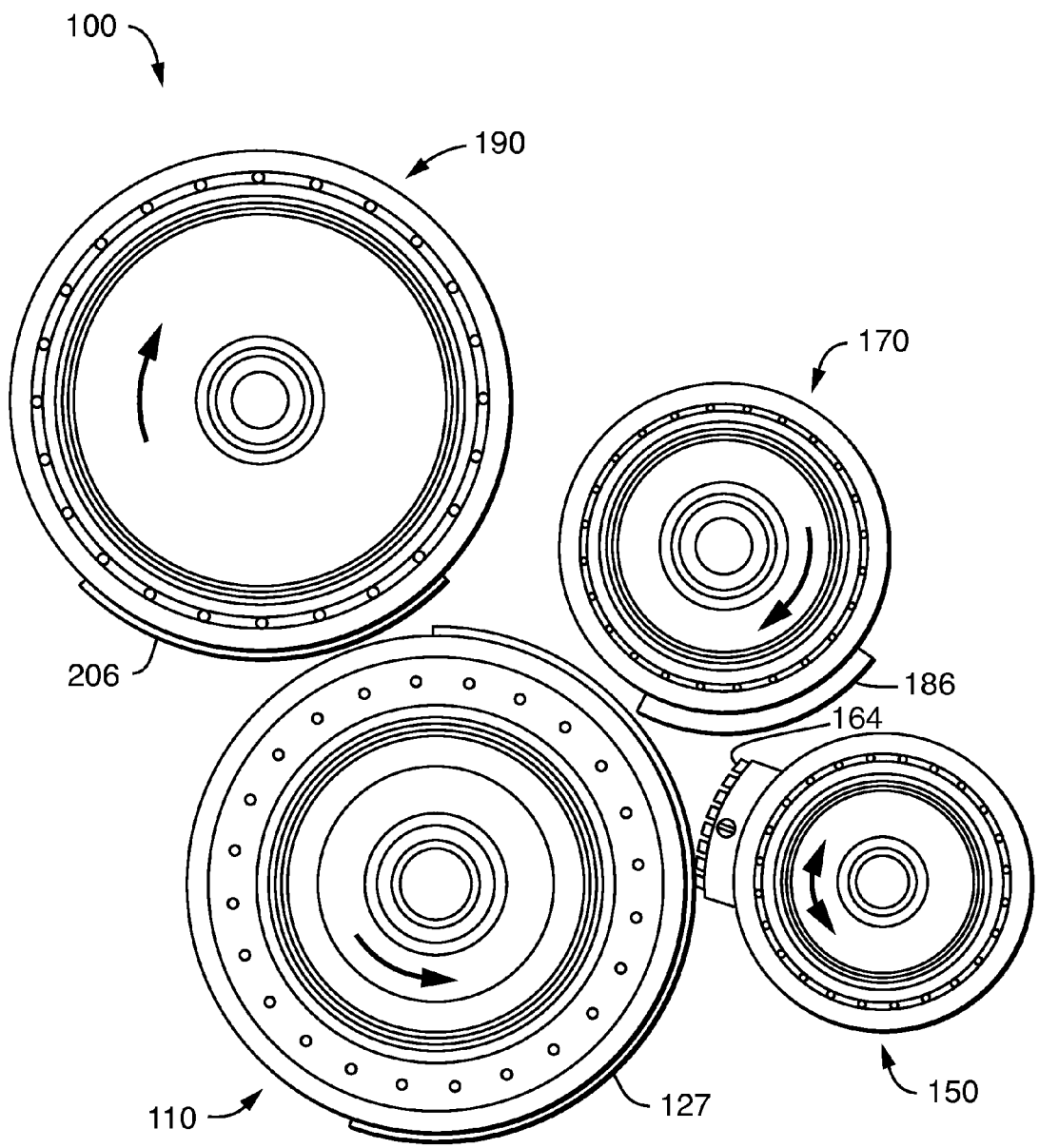
FIG. 2 is a side view of one of the folding apparatus of FIG. 1 removed from the manufacturing system.

Referring now to FIG. 2, a side view of an exemplary folding apparatus 100 of FIG. 1 is representatively illustrated. The folding apparatus 100 comprises a receiving roll 110, a vacuum roll 150, a folding roll 170, and a transferring roll 190. Each of the receiving roll 110, the vacuum roll 150, the folding roll 170, and the transferring roll 190 is indicated generally by their respective reference number. Suitable receiving rolls, folding rolls, and transfer rolls are described in U.S. Patent Application Publication number 2012/0152695, filed Dec. 17, 2010, the entirety of which is incorporated herein by reference where not contradictory.

The receiving roll 110 is adapted to rotate in the direction indicated by the arrow. The receiving roll 110 may include a raised engagement member 127 adapted to receive, hold, and feed the training pant 500 through the folding apparatus 100. The raised engagement member 127 may include a plurality of circular apertures arranged to generally match the profile of the pre-folded configuration of the training pant 500. The illustrated receiving roll 110 is adapted to receive and hold one training pant 500 per revolution. However, in various embodiments, the receiving roll 110 may be adapted to receive and hold a plurality of training pants 500 per revolution. In various embodiments, the raised engagement member 127 can be flush with the remainder of the cylinder or may be raised. In some embodiments, the apertures may have any suitable arrangement, quantity, shape, or size.

The vacuum roll 150 may include a raised puck 164 (broadly, "an engagement area") adapted to receive a portion of the training pant from the receiving roll 110 and to transfer the portion to the folding roll 170. The raised engagement puck 164 may include a plurality of circular apertures arranged to generally match the profile of the pre-folded configuration of the training pant 500. In some embodiments, the puck 164 may be flush with the remainder of the outer cylinder of the vacuum roll 150. In some embodiments, the apertures in the puck 164 may have any suitable arrangement, quantity, shape, or size.

The illustrated folding roll 170 is adapted to rotate in the direction indicated by the arrow. The folding roll 170 may also include a raised puck 186 adapted to receive a portion of the training pant 500 from the vacuum roll 150 and to transfer the portion to the receiving roll 110. The raised puck 186 may include a plurality of circular apertures arranged in any suitable shape such as a rectangle. In various embodiments, the raised puck 186 may be flush with the outer surface of the folding roll 170. In some embodiments, the apertures in the puck 186 may have any suitable arrangement, quantity, shape, or size.

The transferring roll 190 is rotatable in the direction indicated by the arrow. The transferring roll 190 may include a raised engagement member 206 adapted to receive the training pant 500 in its folded configuration from the receiving roll 110. The raised engagement member 206 may include a plurality of circular apertures arranged in any suitable shape, such as in the profile of the training pant 500 in its folded configuration. In some embodiments, the raised engagement member 206 may be flush with the remainder of the outer cylinder of the transferring roll 190. In some embodiments, the apertures in the engagement member 206 may have any suitable arrangement, quantity, shape, or size.

Each of the receiving roll 110, the vacuum roll 150, the folding roll 170 and the transferring roll 190 are described herein as using vacuum to hold the training pant 500 to their respective outer cylinder. It is contemplated, however, that other suitable structures (e.g., adhesive, frictional members, nano-fabricated hairs) capable of grasping, controlling, and releasing the training pant 500 can be used instead of or in conjunction with vacuum.

Referring now to FIGS. 3-8, an exemplary folding apparatus 100 is illustrated folding an exemplary training pant 500. The receiving roll 110 is aligned such that engagement member 127 is subjected to a vacuum. The receiving roll 110 is rotated in a first direction. As illustrated, the receiving roll 110 is rotated in a counterclockwise direction as indicated by the arrow (broadly, a first direction). The receiving roll 110 may be driven at any suitable speed. In some embodiments, the receiving roll 110 is driven at a constant surface speed, and suitably at the same speed that the training pant 500 is traveling on the first conveying member 80.

Figure 3:
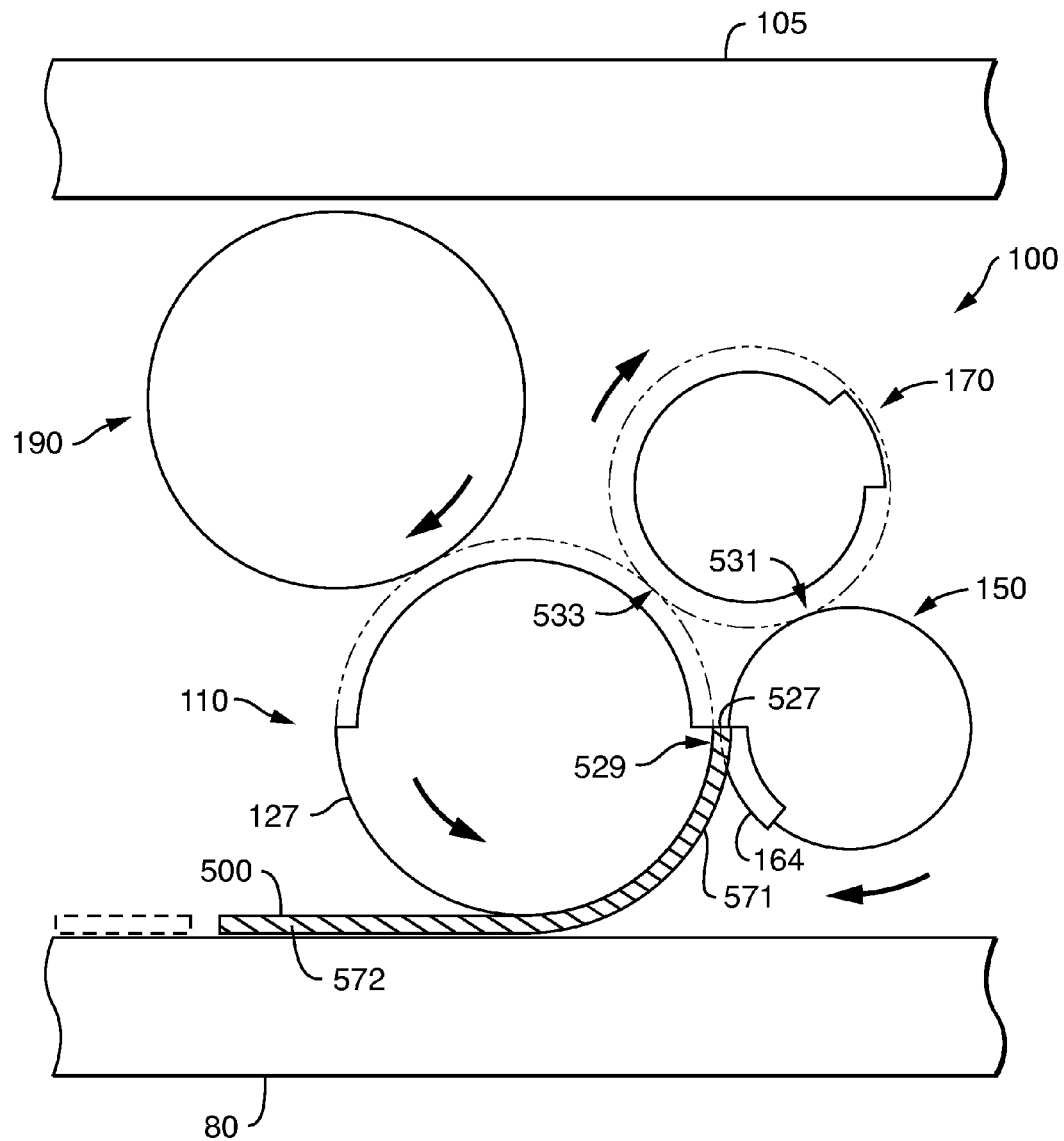
FIGS. 3-8 are schematic views of the folding apparatus of FIG. 2 with an exemplary product at various positions and configurations.
Figure 4:
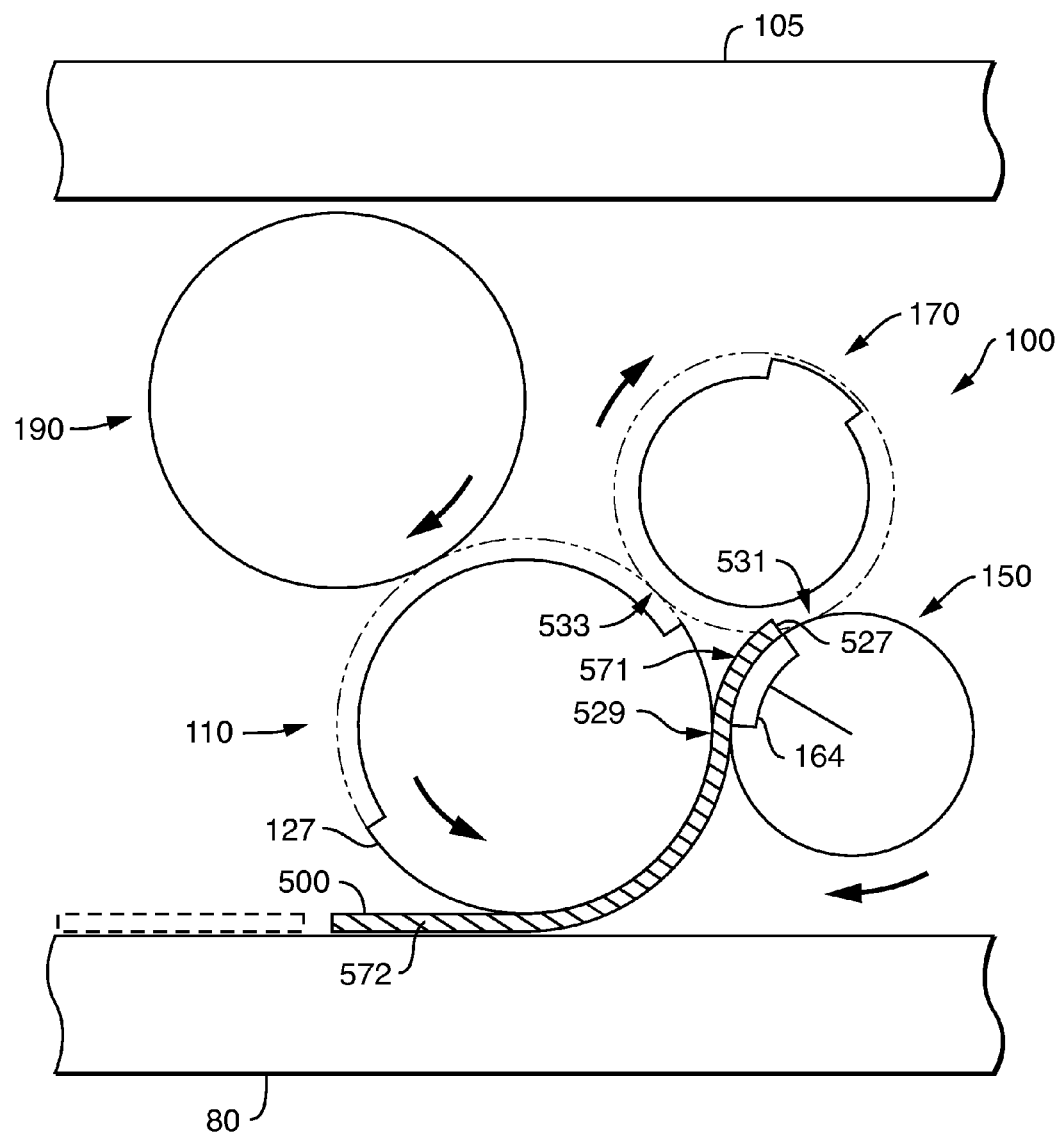
Figure 5:
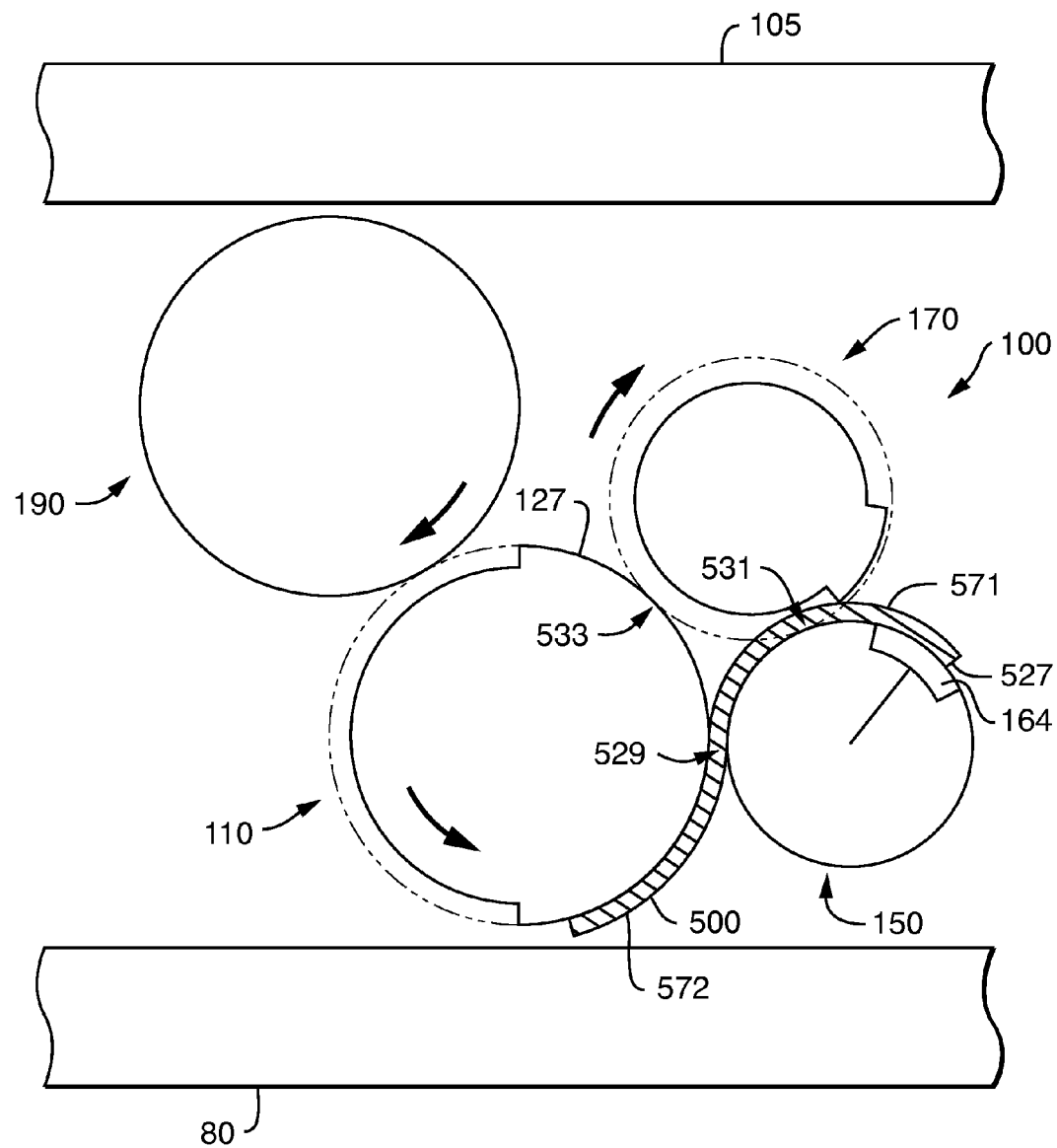

The exemplary training pant 500 defines a leading edge 527, a first portion 571, and a second portion 572. The first portion 571 is proximate the leading edge 527 and the second portion 572 is distal the leading edge 527. When the leading edge 527 of the training pant 500 reaches the receiving roll 110, the training pant 500 is aligned with and grasped by the engagement member 127 of the receiving roll 110 as illustrated in FIG. 3. As the receiving roll rotates away from the first conveying member 80, the leading edge 527 and the first portion 571 of the training pant 500 are lifted from the first conveying member and transferred to the receiving roll. As the second portion 572 of the training pant 500 is delivered to the receiving roll 110 by the first conveying member 80, it is aligned with and grasped by the receiving roll in substantially the same manner as the leading edge 527 as illustrated in FIGS. 4 and 5.

As the training pant 500 rotates with the receiving roll 110, the leading edge 527 of the training pant is moved adjacent the vacuum roll 150 as seen in FIG. 3. The rolls are configured such that the receiving roll 110 defines a first nip 529 with the vacuum roll 150. The vacuum within the receiving roll 110 may be blocked or reduced proximate the first nip 529 to promote the release of the leading edge 527 and subsequently the entire first portion 571 of the training pant 500 as it rotates beyond the first nip 529 as illustrated in FIG. 4.

As the leading edge 527 of the training pant 500 approaches the first nip 529, the puck 164 of the vacuum roll 150 moves adjacent the receiving roll 110 at the first nip 529 as shown in FIG. 3. The vacuum roll 150 is configured such that as the leading edge 527 of the training pant 500 approaches the puck 164 of the vacuum roll 150, the training pant 500 is subject to vacuum such that the training pant 500 is grasped by the puck 164 proximate the first nip 529. In some embodiments, pressurized air may be used to assist in the transfer of the first portion 571 from the receiving roll 110 to the puck 164 of the vacuum roll 150.

The first portion 571 of the training pant 500 is transferred to the puck 164 of the vacuum roll 150 while the vacuum roll 150 is moving in a clockwise direction (broadly, a second direction), which is opposite the rotation of the receiving roll 110. In some embodiments, the vacuum roll 150 may be rotating at approximately the same surface speed as the receiving roll 110 when the first portion 571 of the training pant 500 is transferred from the receiving roll 110 to the vacuum roll member 150.

The second portion 572 of the training pant 500 remains held to the receiving roll 110 as the vacuum continues to be applied at this location on the receiving roll 110 as illustrated in FIG. 5. Once the leading edge 527 of the training pant 500 is transferred from the receiving roll 110 to the vacuum roll 150 (or shortly thereafter), the outer cylinder of the vacuum roll 150 begins to slow down relative to the receiving roll 110. In various embodiments, the outer cylinder of the vacuum roll may be driven with variable surface speed. In some embodiments, the outer cylinder of the vacuum roll may be rotated in a clockwise direction and then rotated in a counterclockwise direction to define an oscillating motion. Because of the slowing, stopping, and changing rotational direction relative to the outer cylinder of the receiving roll 110, the training pant 500 begins to fold as illustrated in FIG. 6 while the first portion 571 of the training pant 500 remains securely held to the puck 164 by the vacuum.

Figure 6:
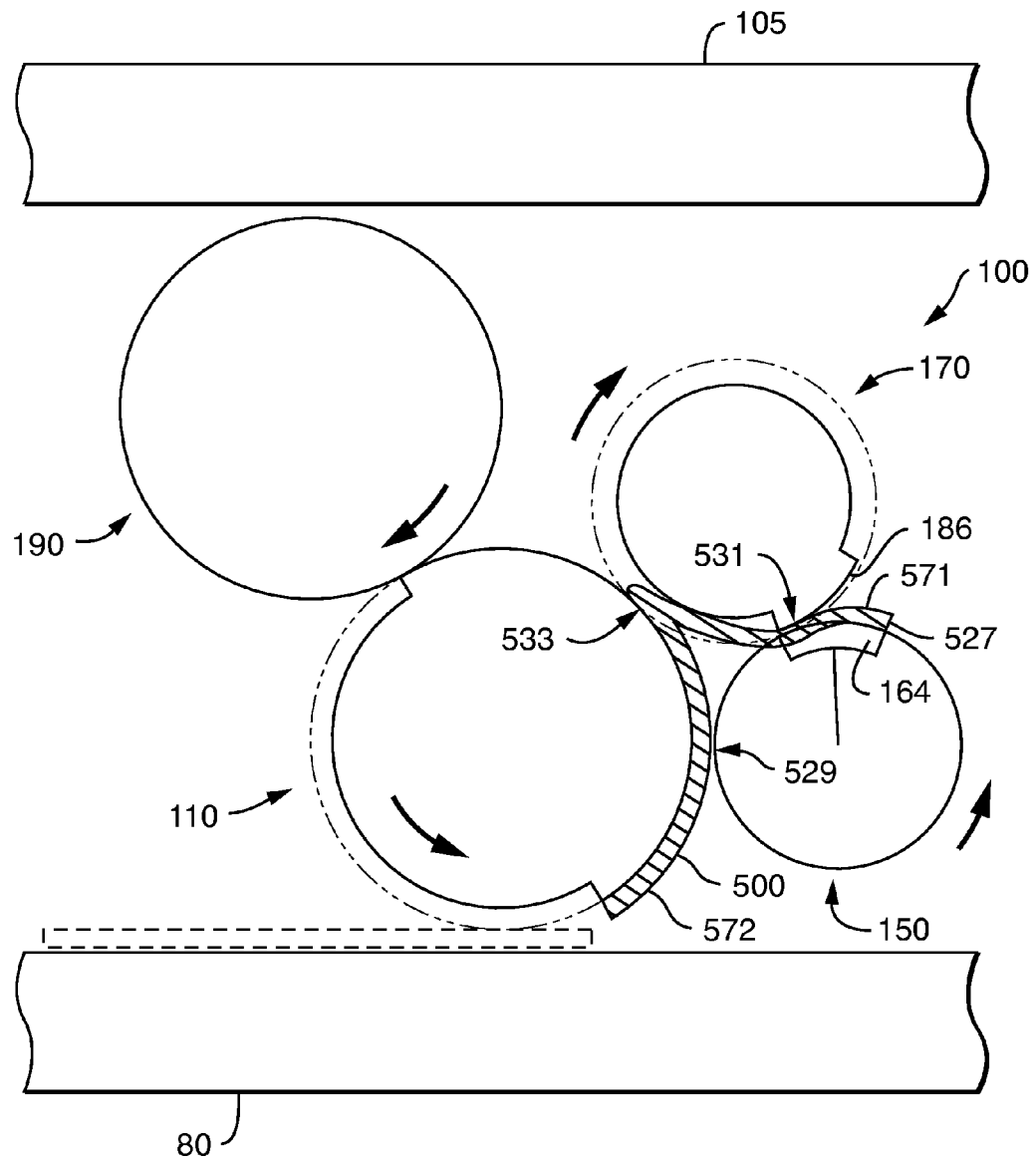

With the vacuum roll 150 now rotating in the counterclockwise direction, the first portion 571 of the training pant 500 is contacted by the puck 186 of the folding roll 170 at a second nip 531 defined by the vacuum roll 150 and the folding roll 170 as illustrated in FIG. 6. At this stage of the process, the outer cylinder of the folding roll 170 is rotating at generally the same surface speed as the outer cylinder of the vacuum roll 150 but in the opposite direction (i.e., clockwise). The rotational surface speed of the outer cylinders of the vacuum roll 150 and the folding roll 170 at this point in the folding process are slower than the rotational surface speed of the receiving roll 110. As a result, the second portion 572 of the training pant 500 is moving faster than the first portion 571.

Figure 7:
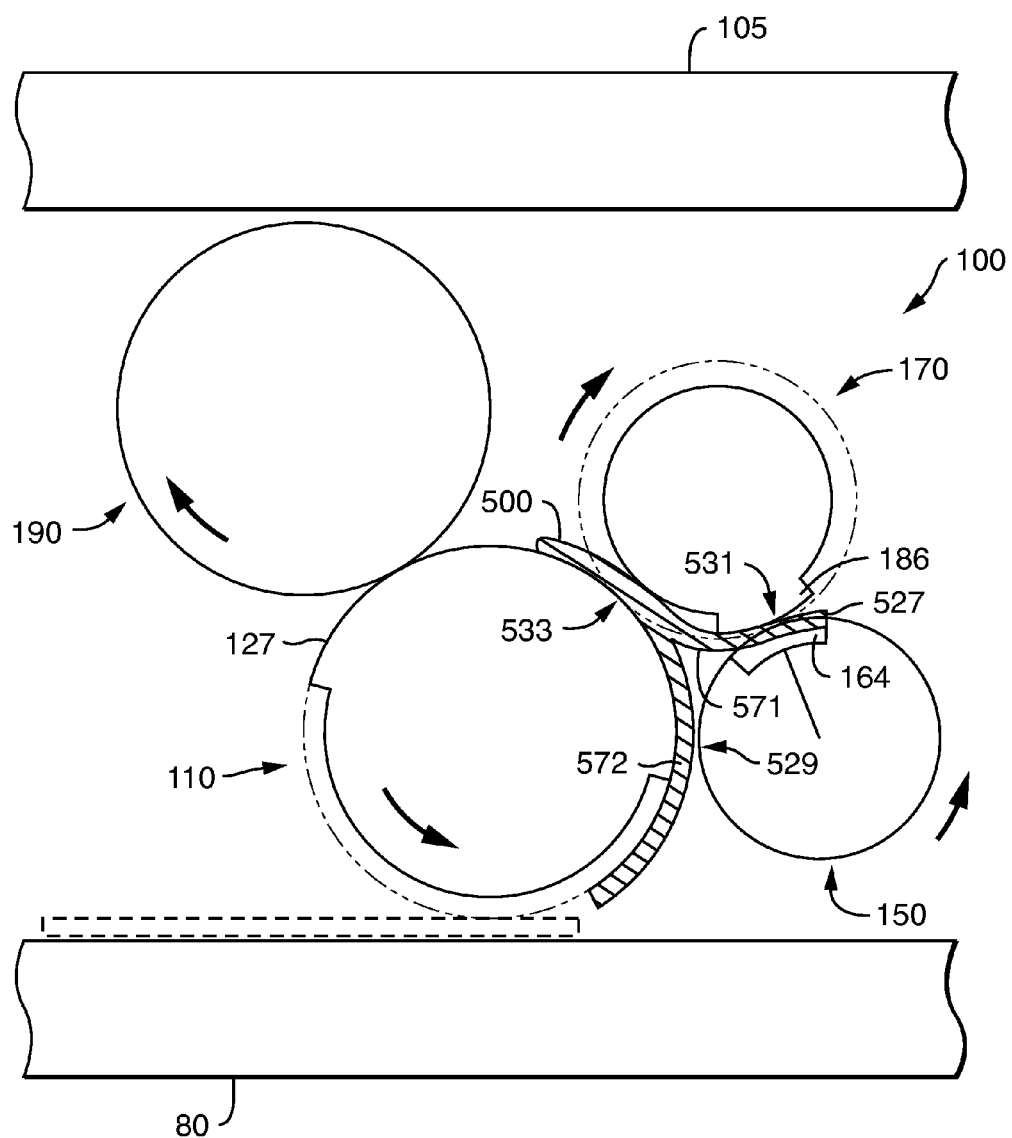

Because the vacuum being applied by the vacuum roll 150 is now blocked proximate the second nip 531, the first portion 571 of the training pant transfers from the puck 164 of the vacuum roll 150 to the puck 186 of the folding roll 170 as illustrated in FIG. 7. The folding roll 170 is configured to apply vacuum to the first portion of the training pant 500. As a result, the first portion 571 of the training pant 500 transfers to the puck 186 of the folding roll 170 at the second nip 531.

Once the first portion 571 of the training pant 500 is transferred from the vacuum roll 150 to the folding roll 170, the rotational surface speed of the outer cylinder of the folding roll 170 is increased by its drive assembly to generally match the rotational surface speed of the outer cylinder of the receiving roll 110. As illustrated in the figures, the outer cylinder of the folding roll 170 is rotating in a clockwise direction which is opposite from the counterclockwise direction of the outer cylinder of the receiving roll 110. The first portion 571 of the training pant 500 is brought back into engagement with the engagement member 127 of the outer cylinder of the receiving roll 110 at a third nip 533 defined between the folding roll 170 and the receiving roll 110 such that the first portion 571 of the training pant is in overlying relationship with the second portion 572 as illustrated in FIG. 7.

Figure 8:
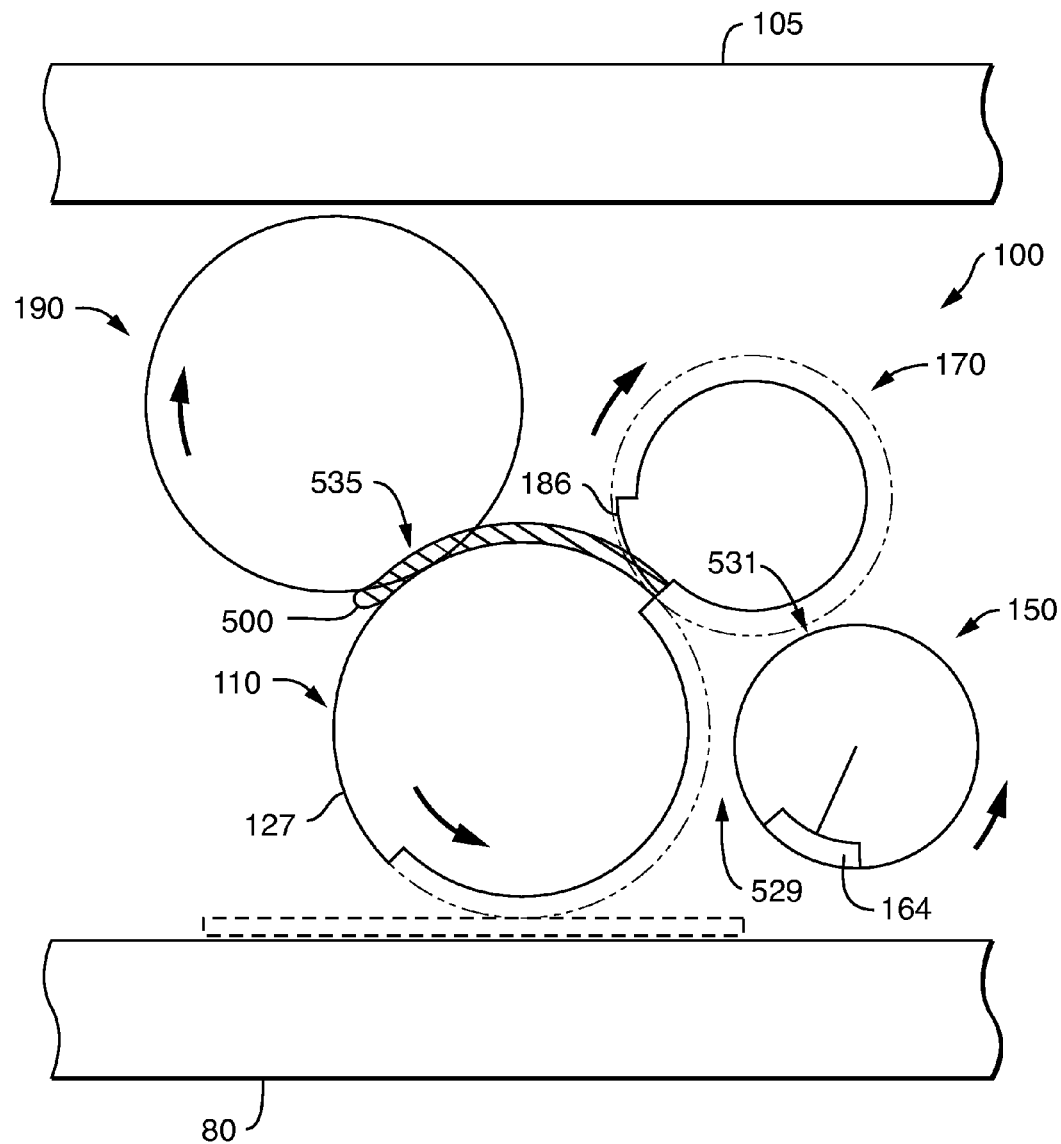

The folding roll 170 is adapted such that the internal vacuum is terminated proximate the third nip 533. As a result, the vacuum holding the first portion 571 of the training pant 500 to the puck 186 of the folding roll 170 is blocked to allow the first portion 571 of the training pant 500 to transfer back to the receiving roll 110 and the training pant 500 is arranged in its folded configuration as illustrated in FIG. 8.

The training pant 500, which is in its folded configuration, is then transferred from the receiving roll 110 to the transferring roll 190 at a fourth nip 535 defined between the receiving roll and the transferring roll. The outer cylinder of the receiving roll 110 continues to rotate in the counterclockwise direction at a constant surface speed. The outer cylinder of the transferring roll 190 rotates at approximately the same surface speed as the outer cylinder of the receiving roll 110 but clockwise.

The receiving roll is adapted to inhibit the vacuum of the receiving roll 110 proximate the fourth nip 535. As a result, the training pant 500 is free from the vacuum of the receiving roll 110 at this location. The transferring roll 190 is adapted such that vacuum is applied starting proximate the fourth nip 535. Thus, the outer cylinder of the transferring roll 190 grasps the training pant 500 and transfers the training pant 500 from the receiving roll 110 to the transferring roll.

With reference again to FIG. 1, the transferring roll 190 carries the training pant 500 to and transfers the training pant 500 to the second conveying member 105, which carries the training pant 500 to additional components of the manufacturing system 50. In the illustrated embodiment, the second conveying member 105 is a vacuum belt conveyor. Other devices suitable for use as the second conveying member 105 are well-known in the art and include, but are not limited to, drums, rollers, air conveyors, vacuum conveyors, chutes, and the like.

Figure 9:
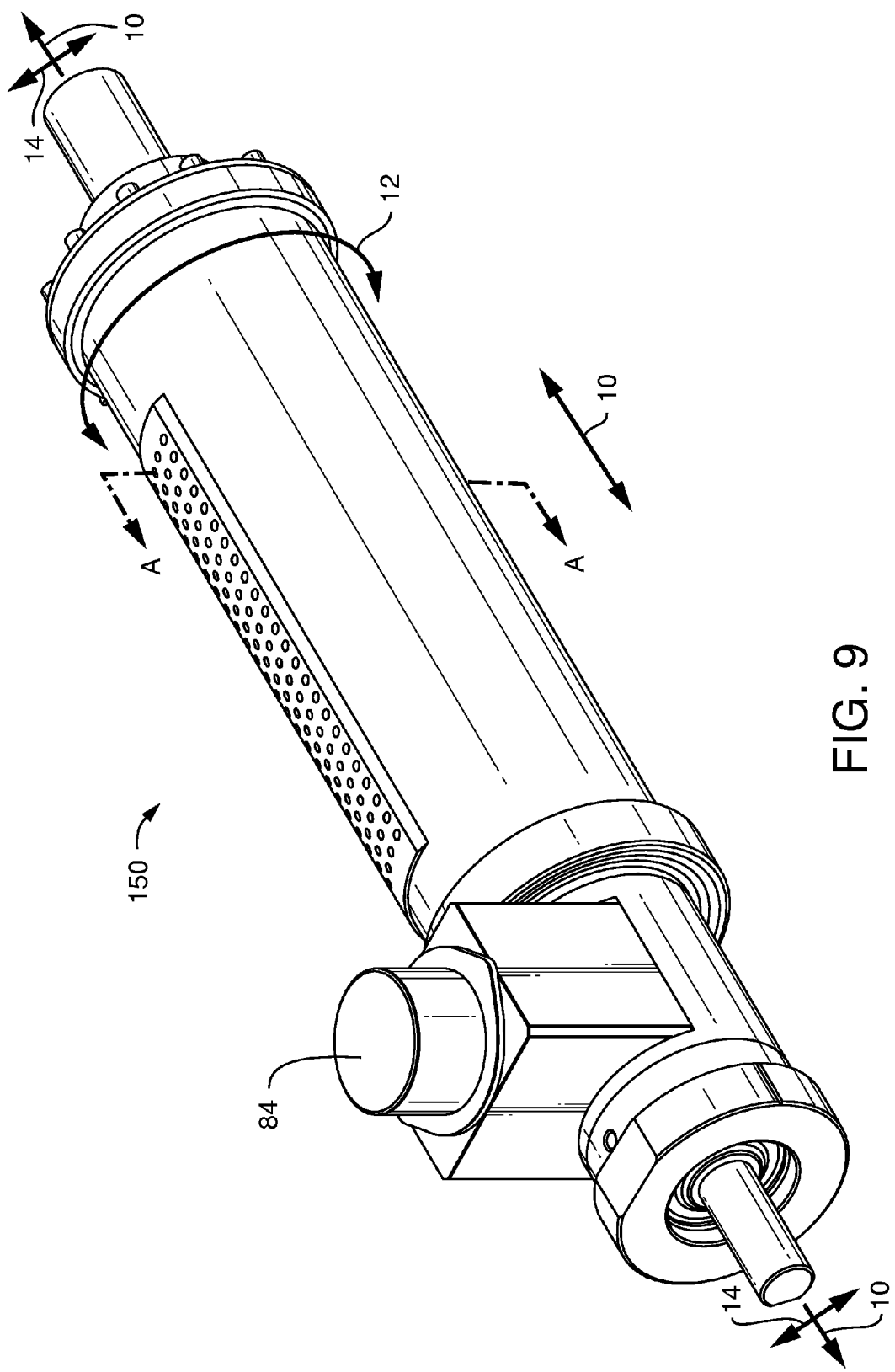
FIG. 9 is a perspective view of an exemplary vacuum roll.
Figure 10:
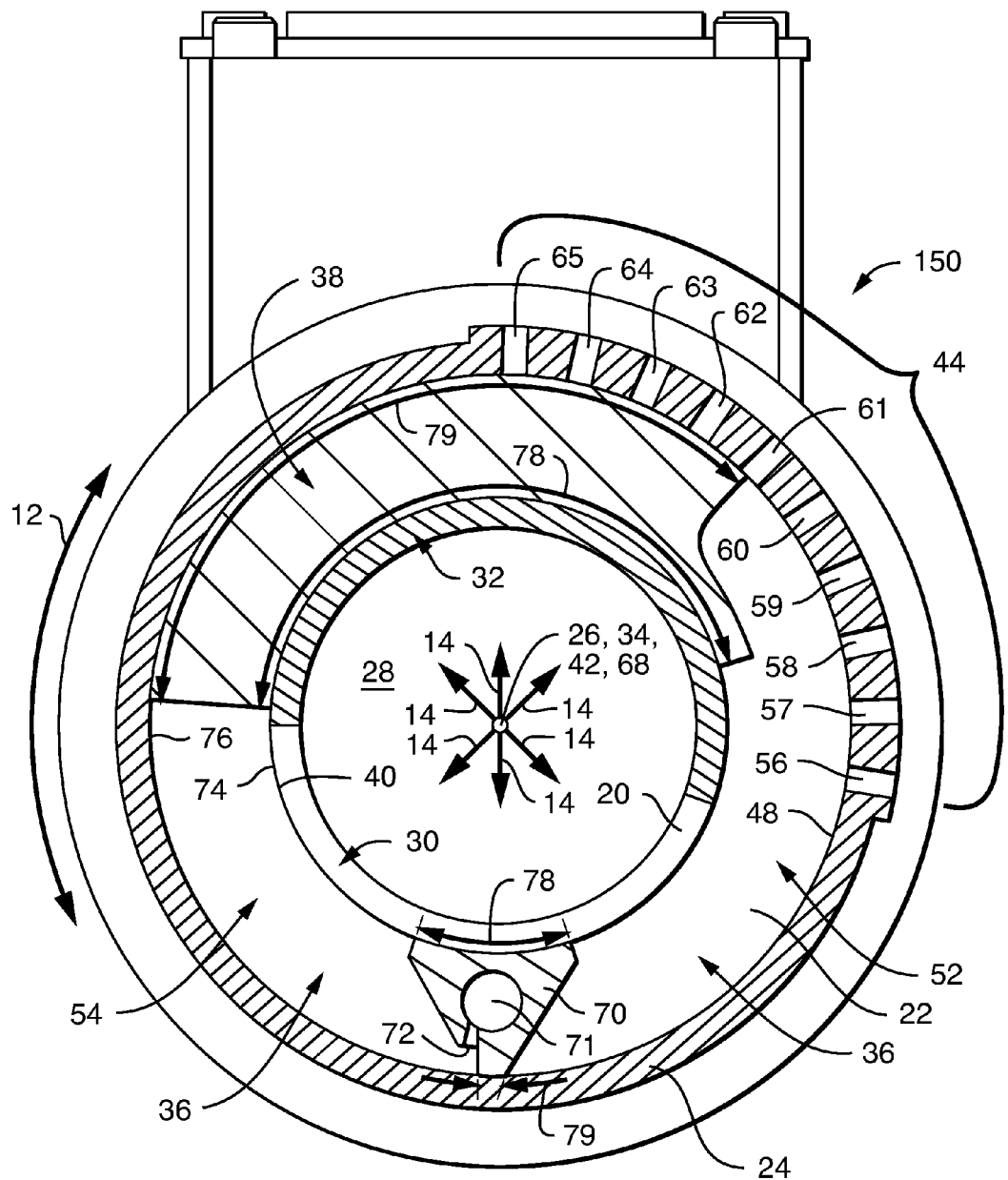
FIG. 10 is a cross-section view of the vacuum roll of FIG. 9 taken along the line A-A.
Figure 11:
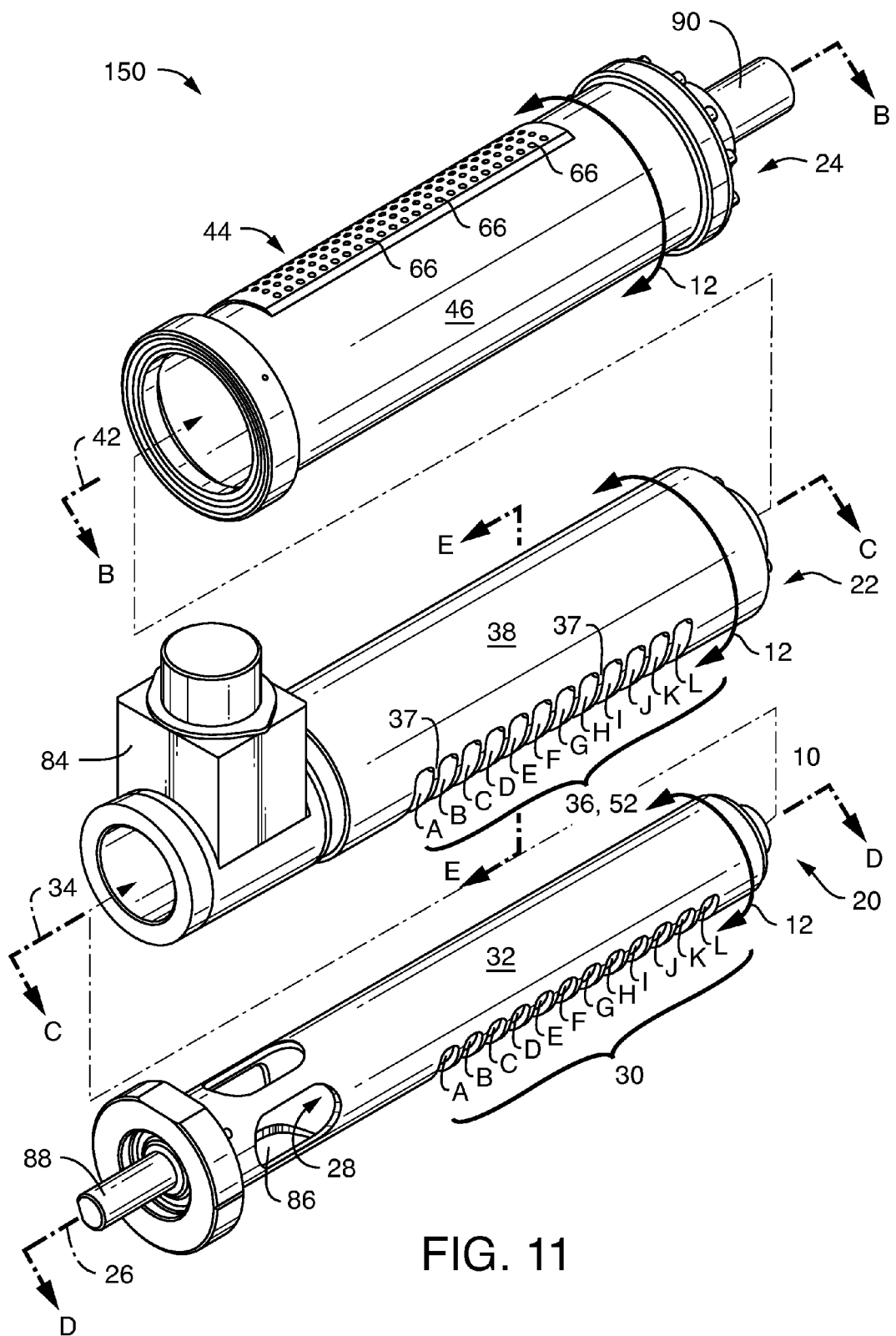
FIG. 11 is an exploded perspective view of the vacuum roll of FIG. 9.
Figure 12A:
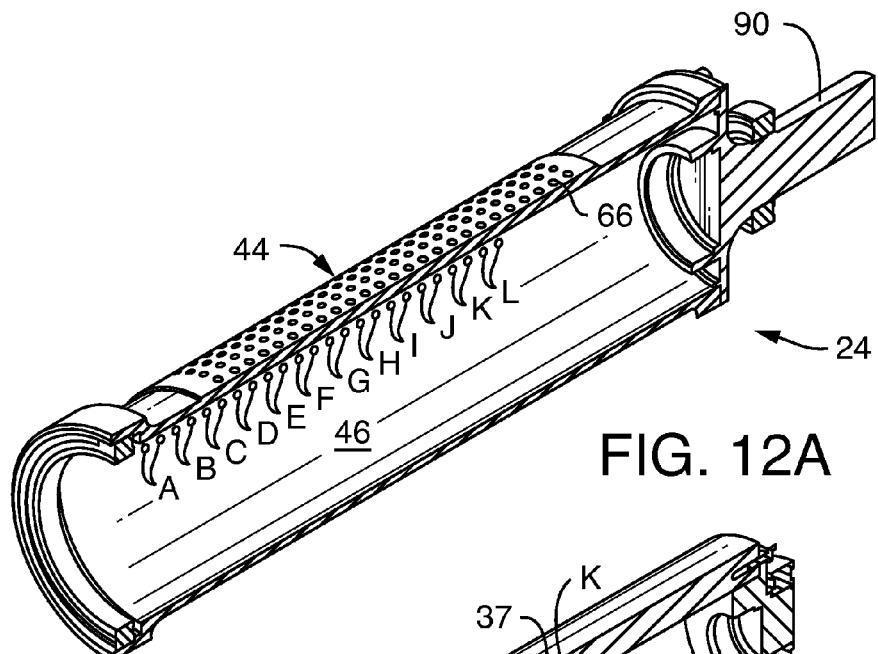
FIGS. 12A, 12B, and 12C are cross-section views of the vacuum roll of FIG. 11 taken along the lines B-B, C-C, and D-D respectively.
Figure 12B:
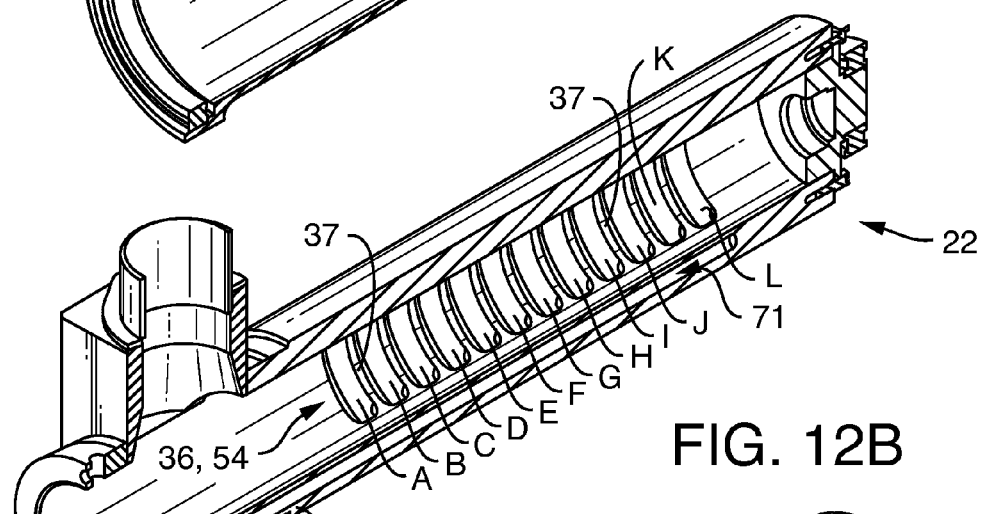
Figure 12C:
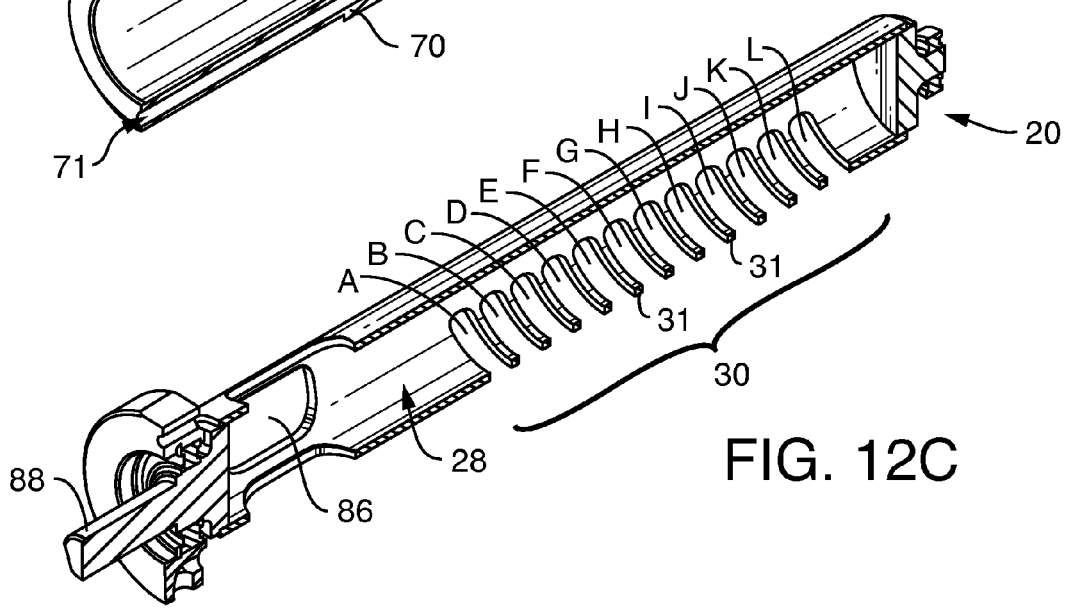
Figure 13:
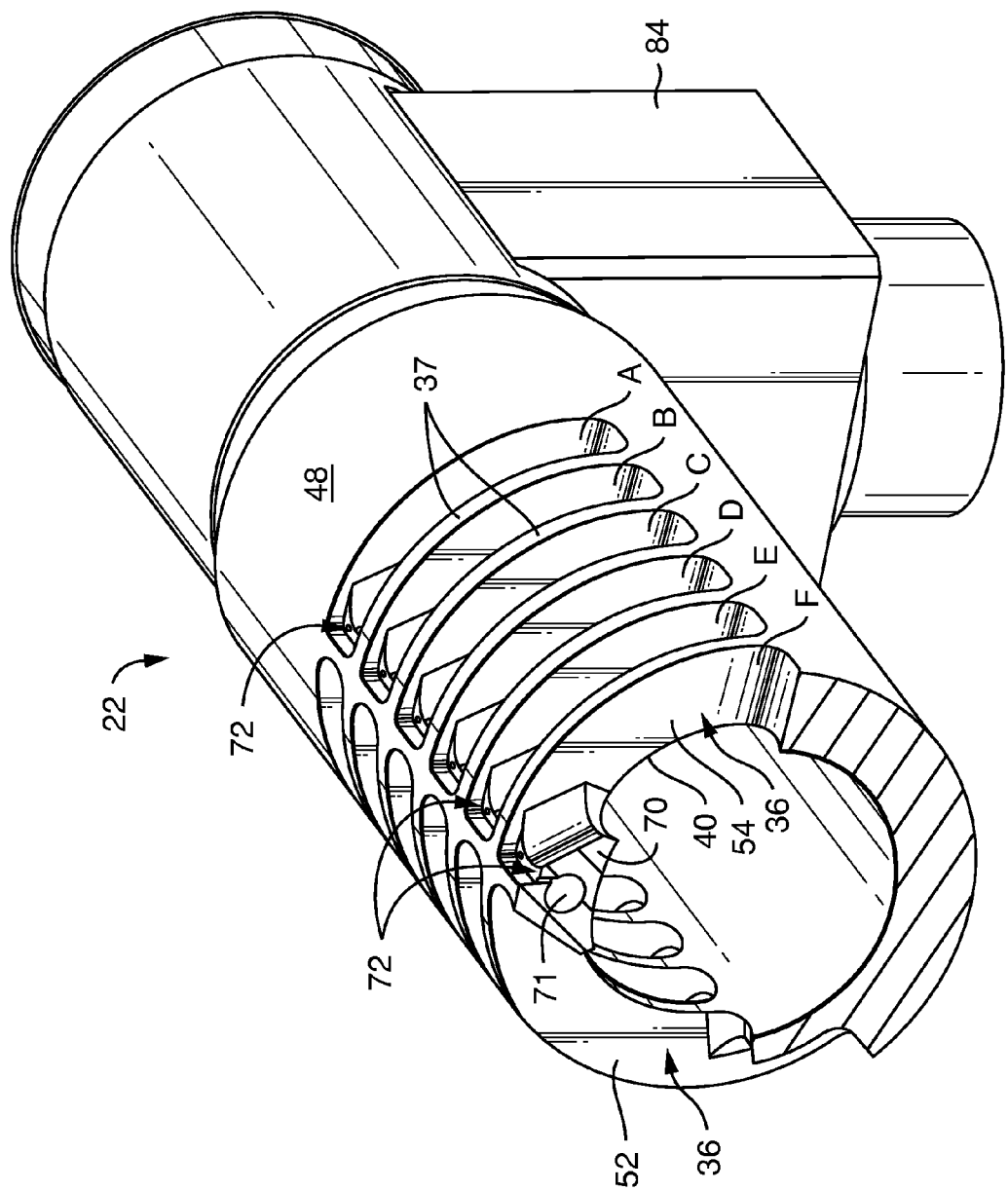
FIG. 13 is a cross-section view of the intermediate stator of FIG. 11 taken along the line E-E.

Referring now to FIG. 9, an exemplary vacuum roll of the present invention is represented generally at 150. FIG. 10 is a cross-sectional view of the vacuum roll 150 of FIG. 9 taken along the line A-A. FIG. 11 is an exploded perspective view of the vacuum roll 150 of FIG. 9. In this view, it can be seen that the vacuum roll 150 includes an inner rotor 20, an intermediate stator 22, and an outer shell roll 24. The inner rotor, intermediate stator, and the outer shell roll of the present invention define an axial direction 10, a circumferential direction 12, and a radial direction 14 as illustrated in FIG. 9. The radial direction 14 is defined as any number of directions "radiating" perpendicularly outward from a center axis as illustrated in FIG. 10. To better illustrate the internal structure of the vacuum roll, FIG. 12A is a cross-section view of the outer shell roll 24 of FIG. 11 taken along the line B-B, FIG. 12B is a cross-section view of the intermediate stator 22 of FIG. 11 taken along the line C-C, and FIG. 12C is a cross-section view of the inner rotor 20 of FIG. 11 taken along the line D-D. Likewise, FIG. 13 is a cross-section view of the intermediate stator 22 of FIG. 11 taken along the line E-E.

The outer shell rolls, the intermediate stators, and the inner rotors of the present invention define one or more open portions and one or more closed portions. As used herein, the terms "open portions" and "closed portions" are defined relative to the circumferential direction and not relative to the axial direction. The "open portion" is defined as a single row in the circumferential direction but may include one or more sub-openings within said row in the axial direction. In various embodiments, the open portion may include a first open portion, a second open portion, a third open portion, etc. A given open portion is adapted for fluid isolation from other open portions relative to the circumferential direction and may include multiple sub-openings extending in the axial direction.

The inner rotor 20 is adapted to rotate around a first axis 26 and defines an interior chamber 28, an open portion 30, and a closed portion 32 as illustrated in FIG. 11. In various embodiments, the open portion of the inner rotor may have any suitable number, configuration, and shape of openings and sub-openings. In some embodiments, the open portion of the inner rotor may include multiple open portions arranged in rows having a plurality of sub-openings extending in the axial direction. In some embodiments, the inner rotor 20 may include an open portion 30 having a single row with multiple sub-openings A-L extending in the axial direction 10 as illustrated in FIGS. 11 and 12C. The sub-openings A-L may be separated by support members 31 (FIG. 12C) that help provide structural integrity to the inner rotor 20 without significantly reducing the overall area of the open portion 30.

The intermediate stator 22 is fixed about a second axis 34 and does not rotate. The intermediate stator 22 surrounds the inner rotor 20. The inner rotor 20 is adapted to rotate within the intermediate stator 22 as illustrated in FIG. 10. The intermediate stator 22 defines an open portion 36 and a closed portion 38 as illustrated in FIGS. 11 and 12B. In various embodiments, the open portion of the intermediate stator may have any suitable number, configuration, and shape of openings and sub-openings. In some embodiments, the open portion of the intermediate stator may include multiple open portions arranged in rows with each row having a plurality of sub-openings extending in the axial direction. In some embodiments, the open portion 36 of the intermediate stator 22 may define a first open portion 52 (FIG. 11) and a second open portion 54 (FIG. 12B) each having multiple sub-openings A-L extending in the axial direction 10. The sub-openings A-L are separated by support members 37 that help provide structural integrity to the intermediate stator 22 without significantly reducing the overall area of the first open portion 52 or the second open portion 54 as illustrated in FIGS. 11, 12B, and 13.

The inner rotor 20 and the intermediate stator 22 define an internal rotary valve interface 40 adapted to control fluid communication between the interior chamber 28 and the open portion 36 of the intermediate stator 22 as illustrated in FIG. 10. Also, because the first open portion 52 is adapted for fluid isolation from the second open portion 54, the fluid communication between the interior chamber 28 and the first open portion 52 can be separately controlled from the fluid communication between the interior chamber 28 and the second open portion 54.

The outer shell roll 24 is adapted to move about a third axis 42 and surround the intermediate stator 22 as illustrated in FIG. 10. The outer shell roll 24 defines an open portion 44 and a closed portion 46 as illustrated in FIGS. 11 and 12A. In various embodiments, the open portion of the outer shell roll may have any suitable number, configuration, and shape of openings and sub-openings. In some embodiments, the open portion of the outer shell roll may include multiple open portions arranged in rows with each row having a plurality of sub-openings extending in the axial direction. For example, the open portion 44 of the outer shell roll 24 may define a plurality of open portions having multiple sub-openings 66 extending in the axial direction 10 as illustrated in FIGS. 11 and 12A. The outer shell roll 24 and the intermediate stator 22 define a transfer interface 48 adapted to control fluid communication between the open portion 36 of the intermediate stator 22 and the open portion 44 of the outer shell roll 24 as illustrated in FIG. 10.

In various embodiments, one or two of the first axis 26, the second axis 34, and the third axis 42 may be different from the remaining two or one axis respectively. In some embodiments, the first axis 26, the second axis 34, and the third axis 42 are the same. In these embodiments, the inner rotor 20, the intermediate stator 22, and the outer shell roll 24 are concentric about a common axis 68 as illustrated in FIG. 10.

In some embodiments, a first open portion of a given roll may be separated from a second open portion of said roll by any suitable means. In some embodiments, the first open portion may be separated from the second open portion by a divider. For example, referring again to FIG. 10, the first open portion 52 of the intermediate stator 22 is separated from the second open portion 54 of the intermediate stator 22 by a divider 70. The divider 70 may include a second fluid supply line 71 extending in the axial direction 10 as best seen in FIG. 12B. Details of the divider 70 are illustrated in FIG. 13, which is a cross-sectional view of FIG. 11 taken along the line E-E. The divider 70 may also include blow offs 72 that create fluid communication between the second fluid supply line 71 and the first open portion 52 or the second open portion 54. In various embodiments, any suitable number of blow offs 72 may be utilized. In the embodiment of FIG. 13, two blow offs 72 are positioned within each sub-opening A-L to align with each column of sub-openings 66 on the outer shell roll 24 (FIG. 11). In various embodiments, the blow offs may be in fluid communication with the first open portion, the second open portion, or both. The second fluid supply line and the blow offs may be adapted to provide positive pressure to the first open portion, the second open portion, or both.

In various embodiments, the inner rotor and/or the outer shell roll may be moved by any suitable drive assembly and mechanism. For example, the inner rotor may be connected to any suitable first drive assembly to rotate the inner rotor about the first axis. Likewise, the outer shell roll may be connected to any suitable second drive assembly to rotate the outer shell roll about the third axis. In various embodiments, the first drive assembly and the second drive assembly may be separate. In some embodiments, a single drive assembly may rotate both the inner rotor and the outer shell roll. In various embodiments, the inner rotor and/or the outer shell roll may be moved in a first direction, a second direction, or both, wherein the first direction is opposite the second direction. In various embodiments, the inner rotor and/or the outer shell roll may be moved at constant velocity or non-constant velocity.

In some embodiments, the inner rotor 20 is connected with a first drive mechanism (not illustrated) via a rotor shaft 88 (FIG. 11) for rotating the inner rotor 20 at a constant velocity while the outer shell roll 24 is connected with a second drive mechanism (not illustrated) via a shell roll shaft 90 (FIG. 11) for co-rotating, counter-rotating, or oscillating the outer shell with respect to the inner spool rotation. In some embodiments, the inner rotor may be rotated about the first axis in the first direction at a constant velocity while the outer shell roll may be oscillated around the third axis alternatively between the first direction and the second direction at a non-constant velocity.

In various embodiments, the intermediate stator 22 defines an internal surface 74 and an external surface 76 as illustrated in FIG. 10. The closed portion 38 of the intermediate stator 22 defines an internal surface closed percentage 78 and an external surface closed percentage 79. In various embodiments, the internal surface closed percentage is greater than, less than, or equal to the outer surface closed percentage. For example, the embodiment illustrated in FIG. 10 has an internal surface closed percentage 78 of about 56% and an outer surface closed percentage 79 of about 40%. Having internal surface closed percentages different than outer surface closed percentages, in various embodiments, allows more optimization of the vacuum profile by optimizing the rotary valve interface and/or the transfer interface.

In various embodiments, the inner rotor and the outer shell roll may have diameters relative to the intermediate stator to provide any suitable radial clearance. For example, in some embodiments, the radial clearance between the outer shell roll and the intermediate stator is less than 0.030, 0.020, or 0.010 inch and the radial clearance between the intermediate stator and the outer shell roll is less than 0.030, 0.020, or 0.010 inch. In some embodiments, the radial clearance between the outer shell roll and the intermediate stator is about 0.005 to about 0.007 inch. Likewise, in some embodiments, the radial clearance between the inner rotor and the intermediate stator is about 0.005 to about 0.007 inch. The relatively small clearances allow for better valving, fluid isolation, and fluid communication from roll to roll and less vacuum and/or pressure losses between the rolls.

In various embodiments, the interior chamber 28 of the inner rotor 20 may be connected with any suitable vacuum source. As illustrated in FIG. 11, the interior chamber 28 of the inner rotor 20 is connected to a vacuum source (not shown) via a port 84 positioned in a radial direction relative to the center axis. The inner rotor 20 includes vacuum source openings 86 as illustrated in FIG. 11. The vacuum source openings 86 allow for constant fluid communication from the vacuum source through the port 84 to the inner chamber 28 while the inner rotor 20 is rotating.

Figure 14:
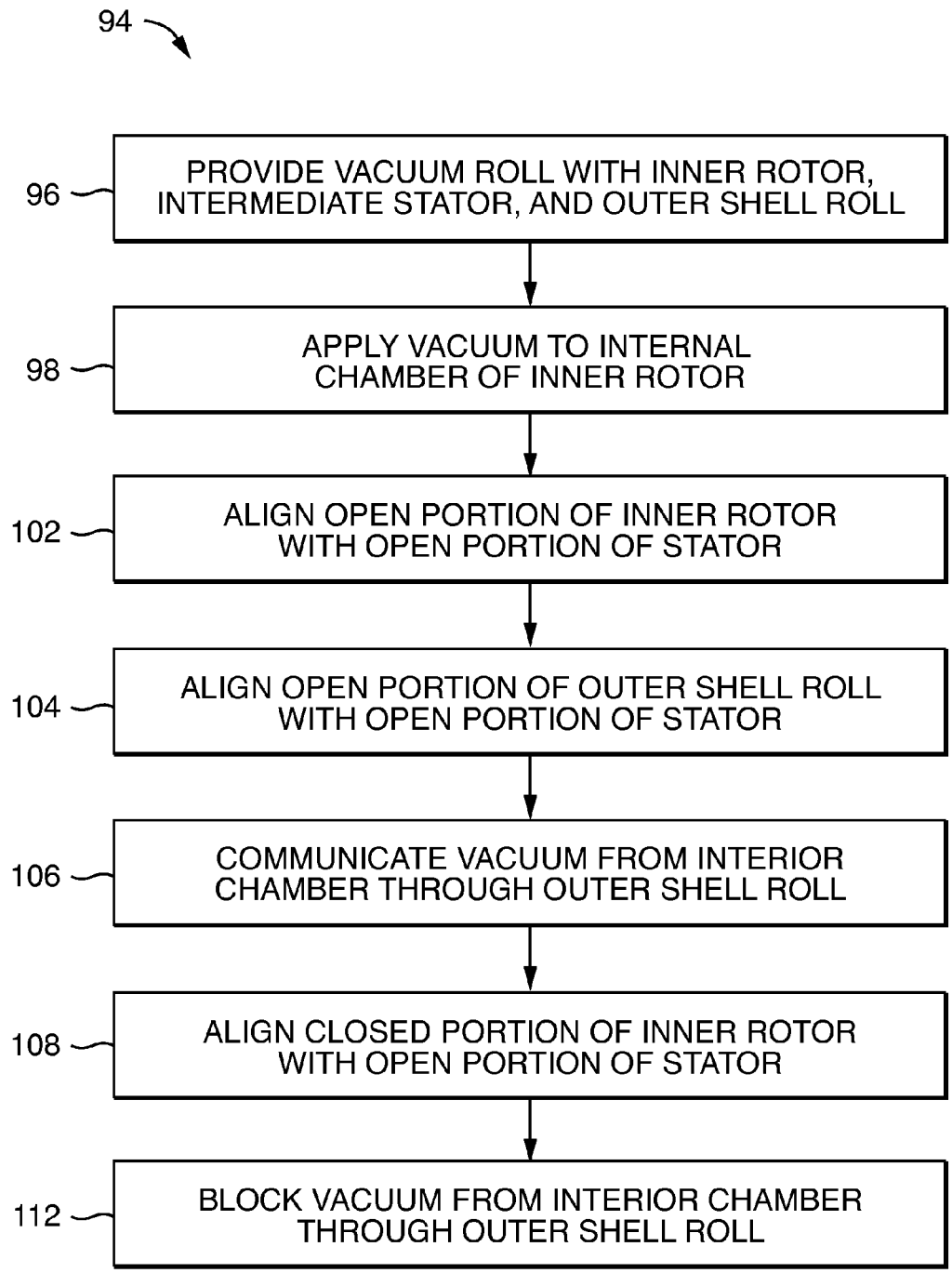
FIG. 14 is a block diagram of an exemplary method of the present invention.

Any of the various vacuum rolls described herein may be used to create a circumferential vacuum profile. Referring now to FIG. 14, a block diagram of an exemplary method 94 of the present invention is representatively illustrated. The method 94 includes a step 96 of providing a vacuum roll with an inner rotor, intermediate stator, and an outer shell roll. Suitable vacuum rolls include those described herein.

The inner rotor includes an interior chamber that is in fluid communication with a vacuum source. The inner rotor defines an open portion and a closed portion and is adapted to move about a first axis. The intermediate stator is rotationally fixed about a second axis and surrounds the inner rotor. The intermediate stator also defines an open portion and a closed portion. The outer shell roll surrounds the intermediate stator and defines an open portion and a closed portion.

The method 94 further includes a step 98 of applying vacuum to the interior chamber of the inner rotor. In various embodiments, the step 98 may also include continuously applying vacuum to the internal chamber. In some embodiments, the step 98 may include intermittently applying vacuum to the internal chamber.

The method 94 further includes a step 102 of aligning the open portion of the inner rotor with the open portion of the stator and a step 104 of aligning the open portion of the outer shell roll with the open portion of the stator. Steps 102 and 104 of method 94 allow for a step 106 of communicating vacuum from the interior chamber through the outer shell roll. In various embodiments, the step 102 may include rotating the inner rotor within the intermediate stator in a first direction to at least partially align the open portion of the inner rotor with the open portion of the intermediate stator. In various embodiments, the step 104 may include moving the outer shell roll around the intermediate stator in the first direction to a first shell position that at least partially aligns the open portion of the outer shell roll with the open portion of the intermediate stator.

The method 94 further includes a step 108 of aligning the closed portion of the inner rotor with the open portion of the stator. Step 108 allows for a step 112 of blocking vacuum from the interior chamber of the inner rotor to the open portion of the intermediate stator.

In some embodiments of the method 94, the open portion of the intermediate stator includes a first open portion and a second open portion that is adapted for fluid isolation from the first open portion. In some embodiments, the method 94 further includes the steps of applying vacuum to the first open portion of the intermediate stator, then applying vacuum to the second open portion of the intermediate stator while simultaneously blocking vacuum to the first open portion. In some embodiments, the step 104 may include oscillating the outer shell roll to align the open portion of the outer shell with the open portion of the intermediate stator.

Figure 15:
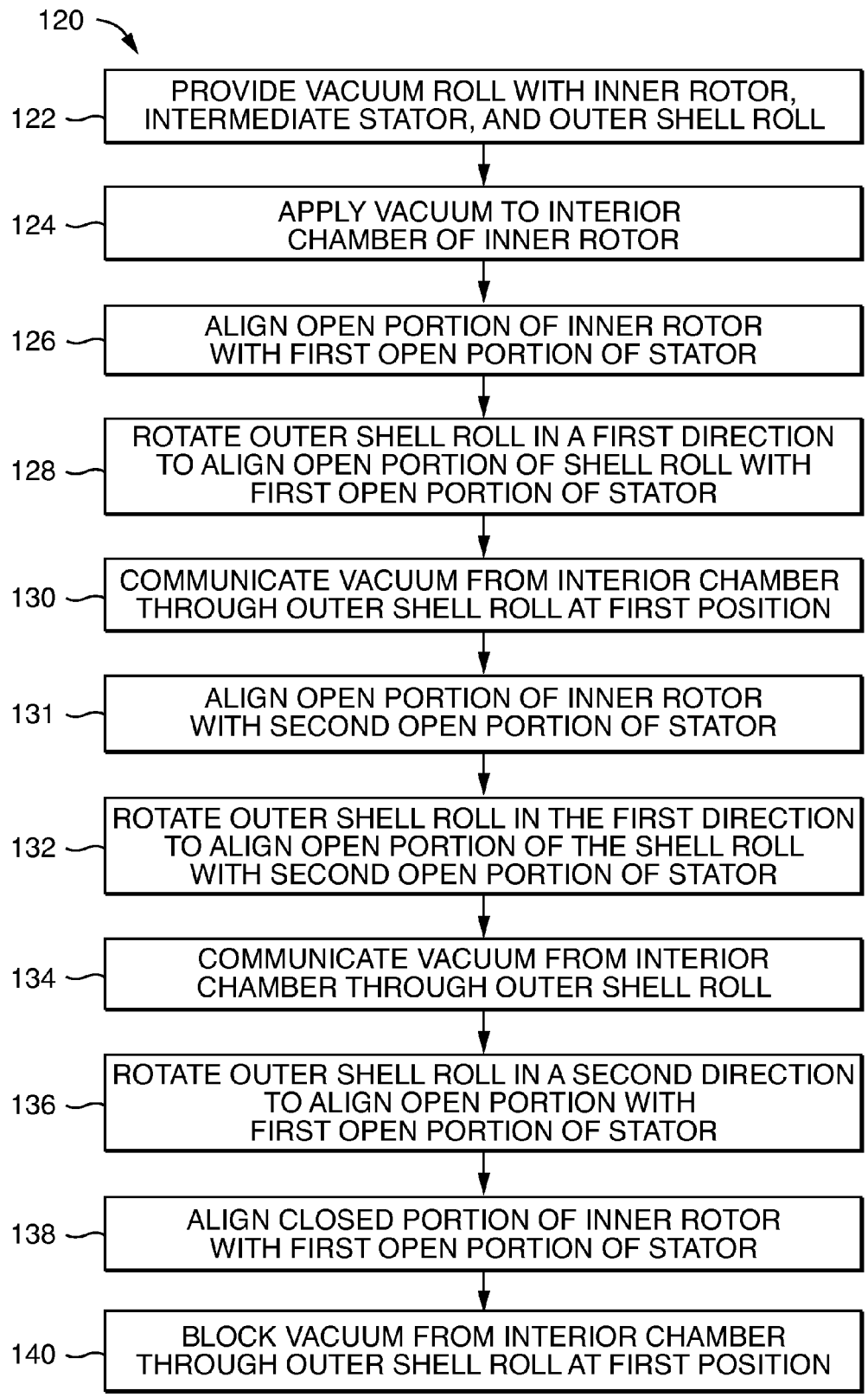
FIG. 15 is a block diagram of another exemplary method of the present invention.

Referring now to FIG. 15, a block diagram of another exemplary method 120 of the present invention is representatively illustrated. The method 120 includes a step 122 of providing a vacuum roll with an inner rotor, intermediate stator, and outer shell roll. Suitable vacuum rolls include those described herein.

The inner rotor includes an interior chamber that is in fluid communication with a vacuum source. The inner rotor defines an open portion and a closed portion and is adapted to rotate around a first axis. The intermediate stator is rotationally fixed about a second axis and surrounds the inner rotor. The intermediate stator also defines a first open portion, a second open portion, and a closed portion. The outer shell roll surrounds the intermediate stator and defines an open portion and a closed portion. The method 120 further includes a step 124 of applying vacuum to the interior chamber of the inner rotor. In various embodiments, the step 124 may also include continuously applying vacuum to the internal chamber.

The method 120 further includes a step 126 of aligning the open portion of the inner rotor with the first open portion of the intermediate stator and a step 128 of rotating the outer shell roll in a first direction to a first shell position to align the open portion of the shell roll with the first open portion of the intermediate stator. The steps 126 and 128 facilitate a step 130 of communicating vacuum from the interior chamber of the inner rotor through the outer shell roll.

The method 120 further includes a step 131 of aligning the open portion of the inner rotor with the second open portion of the intermediate stator and a step 132 of rotating the outer shell roll in the first direction to align the open portion of the shell roll with the second open portion of the intermediate stator. The steps 131 and 132 facilitate a step 134 of communicating vacuum from the interior chamber of the inner rotor through the outer shell roll.

The method 120 further includes a step 136 of rotating the outer shell roll in a second direction, opposite the first direction, to the first shell position and thus aligning the open portion of the shell roll with the first open portion of the intermediate stator. The method 120 also includes a step 138 of aligning the closed portion of the inner rotor with the first open portion of the intermediate stator concurrently with step 136. The steps 136 and 138 facilitate a step 140 of blocking vacuum from the interior chamber of the inner rotor through the outer shell roll at the first shell position.

Referring now to FIGS. 16-23, a cross sectional view of another exemplary vacuum roll 210 is representatively illustrated in various configurations and conditions. FIGS. 16-23 are presented sequentially to illustrate exemplary steps for creating a circumferential vacuum profile. The vacuum roll 210 includes an inner rotor 212, an intermediate stator 214, and an outer shell roll 216. The rolls 210, 212, 214 and 216 each define an axial direction 10, a circumferential direction 12, and a radial direction 14. In various embodiments, the rolls 212, 214, and/or 216 may include any or all of the respective features and combinations of any of the inner rotors, intermediate stators, and/or outer shell rolls described herein.

The inner rotor 212 is adapted to rotate around a common axis 218 and defines an interior chamber 220, an open portion 222, and a closed portion 224. In various embodiments, the open portion of the inner rotor may have any suitable number, configuration, and/or shape of openings and sub-openings. In some embodiments, the open portion of the inner rotor may include multiple open portions arranged in rows having a plurality of sub-openings extending in the axial direction. In some embodiments, the inner rotor may include a single open portion having multiple sub-openings extending in the axial direction 10. However, only a single sub-opening of the open portion 222 is visible in the cross-sectional views of FIGS. 16-23 for purposes of clarity. In various embodiments, the sub-openings may be separated by support members that help provide structural integrity to the inner rotor 212 without significantly reducing the overall area of the open portion 222.

The intermediate stator 214 is fixed about the common axis 218 and does not rotate. The intermediate stator 214 surrounds the inner rotor 212. The inner rotor 212 is adapted to rotate within the intermediate stator 214. The intermediate stator 214 defines an open portion 226 and a closed portion 228. In various embodiments, the open portion of the intermediate stator may have any suitable number, configuration, and/or shape of openings and sub-openings. In some embodiments, the open portion of the intermediate stator may include multiple open portions arranged in rows having a plurality of sub-openings extending in the axial direction. However, only a single sub-opening of the open portion 226 is visible in the cross-sectional views of FIGS. 16-23 for purposes of clarity. In some embodiments, and as illustrated, the open portion 226 of the intermediate stator 214 may define a first open portion 230 and a second open portion 232. In some embodiments, the first open portion and/or the second open portion of the intermediate stator may include multiple open portions arranged in rows having a plurality of sub-openings extending in the axial direction. However, only a single sub-opening of the first open portion 230 and only a single sub-opening of the second open portion 232 are visible in the cross-sectional views of FIGS. 16-23 for purposes of clarity.

The inner rotor 212 and the intermediate stator 214 define an internal rotary valve interface 234 adapted to control fluid communication between the interior chamber 220 and the open portion 226 of the intermediate stator 214. Also, because the first open portion 230 is adapted for fluid isolation from the second open portion 232, the fluid communication between the interior chamber 220 and the first open portion 230 can be separately controlled from the fluid communication between the interior chamber 220 and the second open portion 232.

The outer shell roll 216 is adapted to move about the common axis 218 and surround the intermediate stator 214. The outer shell roll 216 defines an open portion 236 and a closed portion 238. In various embodiments, the open portion of the outer shell roll may have any suitable number, configuration, and/or shape of openings and sub-openings. In some embodiments, the open portion of the outer shell roll may include multiple open portions arranged in rows having a plurality of sub-openings extending in the axial direction. In some embodiments, the open portion 236 of the outer shell roll may define a plurality of open portions 240-249 having multiple sub-openings extending in the axial direction 10. However, only a single sub-opening for each of the open portions 240-249 is visible in the cross-sectional views of FIGS. 16-23 for purposes of clarity.

The outer shell roll 216 and the intermediate stator 214 define a transfer interface 250 adapted to control fluid communication between the open portion 226 of the intermediate stator 214 and the open portion 236 of the outer shell roll 216. Likewise, the outer shell roll 216 also defines a product surface 262 opposite the transfer interface 250.

The first open portion of a given roll may be separated from a second open portion of said roll in the circumferential direction by any suitable means. In some embodiments, the first open portion may be separated from the second open portion by a closed portion. In some embodiments, the first open portion may be separated from the second open portion by a closed portion having a divider. For example, the first open portion 230 of the intermediate stator 214 may optionally be separated from the second open portion 232 of the intermediate stator 214 by a divider 252. In various embodiments, the divider may be solid. In other embodiments, the divider 252 may include a second fluid supply line 254 extending in the axial direction 10 as illustrated in FIGS. 16-23. The divider may also include one or more openings that allow fluid communication between the second fluid supply line and the first open portion and/or the second open portion of the intermediate stator. In various embodiments, the openings in the divider may allow fluid communication of pressurized fluid from the second fluid supply line and the open portion of the intermediate stator. In these embodiments, the openings may be referred to as blow offs. For example, in the embodiment illustrated in FIGS. 16-23, the divider 252 includes a blow off 256 that facilitates fluid communication between the second fluid supply line 254 and the first open portion 230 of the intermediate stator 214.

Figure 16:
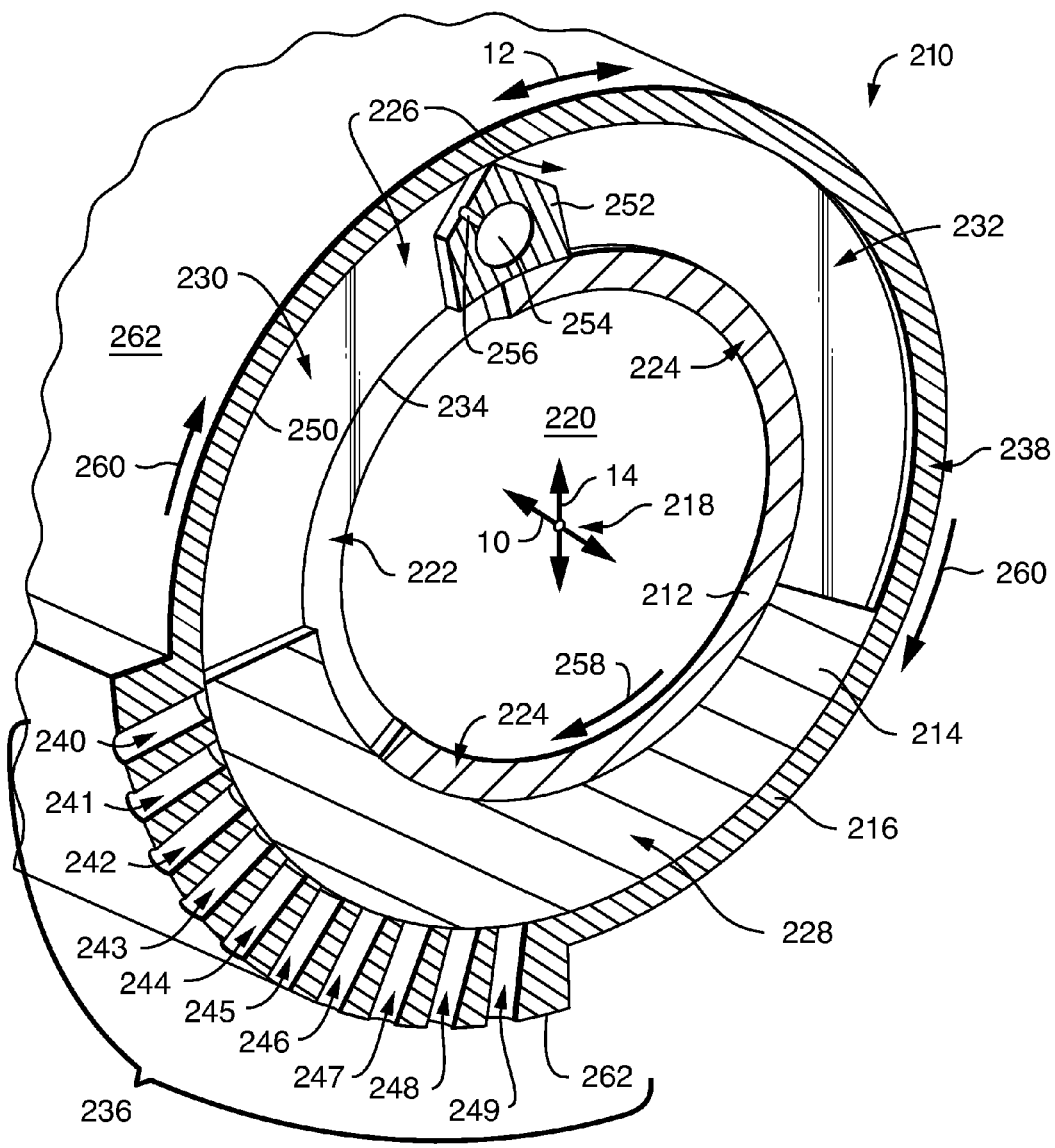
FIGS. 16-23 are perspective cross-sectional views of an exemplary vacuum roll in various configurations and conditions.

Referring now to FIG. 16, the vacuum roll 210 is illustrated with the inner rotor 212 rotating about the common axis 218 in a first rotor direction 258. The interior chamber 220 is in fluid communication with a vacuum source. In various embodiments, the vacuum source may be adapted to apply vacuum to the interior chamber 220. In various embodiments, the vacuum applied to the interior chamber 220 may be continuously supplied or may be intermittently supplied. In various embodiments, the vacuum may be applied at a first level and/or a second level that is different than the first level. The vacuum from the interior chamber 220 may be communicated to the first open portion 230 of the intermediate stator 214 by rotating the inner rotor 212, in the circumferential direction 12, within the intermediate stator 214, to at least partially align the open portion 222 of the inner rotor 212 with the first open portion 230 of the intermediate stator 214 to define the rotary valve interface 234 in a first valve ON condition as illustrated in FIG. 16. Likewise, the vacuum from the interior chamber 220 may be blocked to the second open portion 232 of the intermediate stator 214 by complete alignment of the closed portion 224 of the inner rotor 212 with the second open portion 232 of the intermediate stator 214 to define the rotary valve interface 234 in a second valve OFF condition as also illustrated in FIG. 16.

Still referring to FIG. 16, the outer shell roll 216 is illustrated rotating about the common axis 218 in a first shell direction 260 and at a first shell position. The vacuum from the first open portion 230 of the intermediate stator 214 is blocked from the open portion 236 of the outer shell roll 216 by completely aligning the open portion 236 of the outer shell roll 216 with the closed portion 228 of the intermediate stator 214. Thus, the vacuum from the interior chamber 220 is communicated to the first open portion 230 of the intermediate stator 214 but is blocked from the open portion 236 of the shell. In this shell position and rotary valve interface condition, the vacuum roll 210 has no vacuum force applied to the product surface 262 of the outer shell roll 216.

Figure 17:
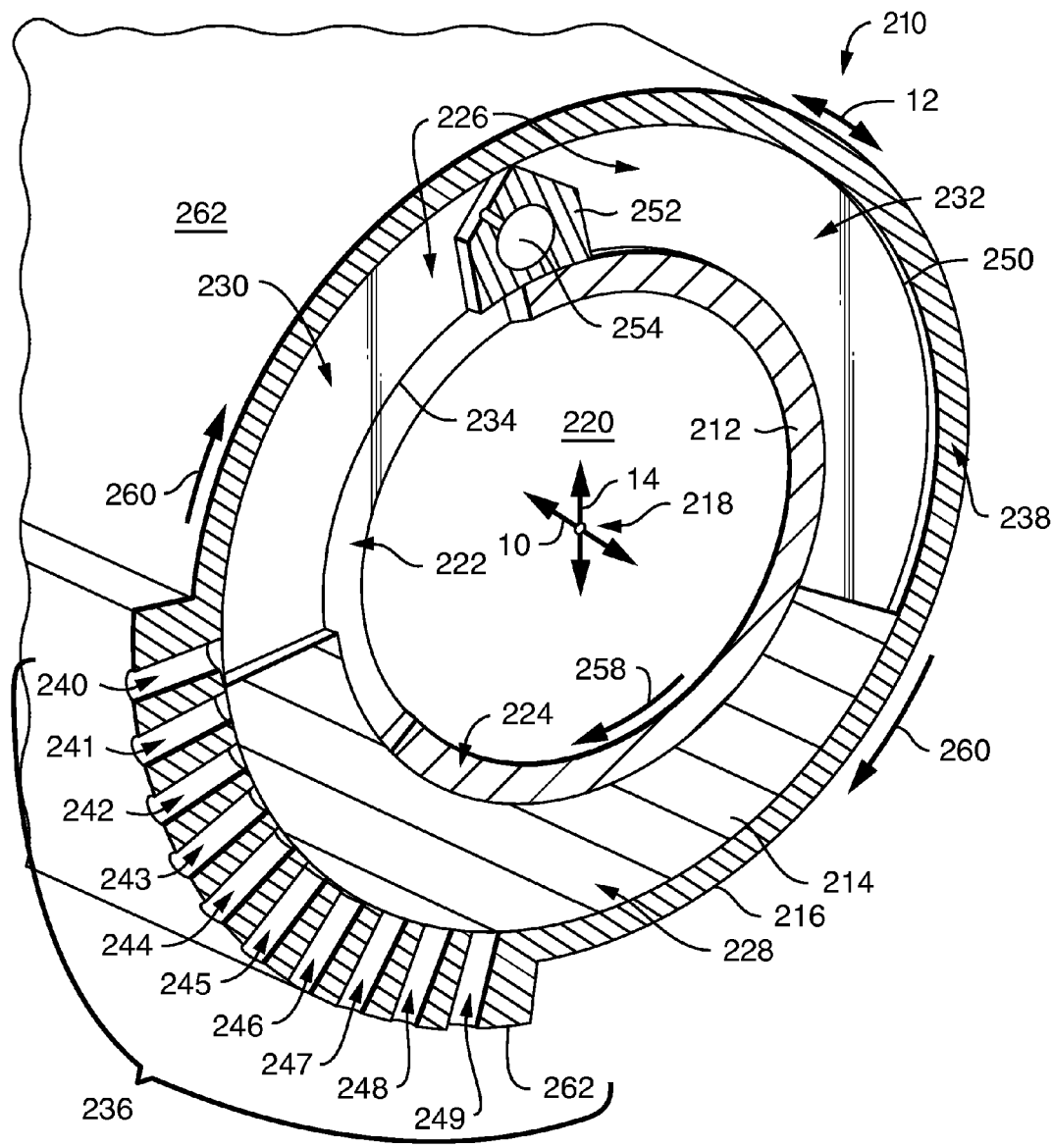

Referring now to FIG. 17, the vacuum roll 210 is illustrated with the inner rotor 212 continuing to rotate about the common axis 218 in the first rotor direction 258. The vacuum from the interior chamber 220 continues to be communicated to the first open portion 230 of the intermediate stator 214 because the rotary valve interface 234 remains in the first valve ON condition. The outer shell roll 216 continues to rotate about the common axis 218 in the first shell direction 260 to a second shell position. In this position and valve condition, the vacuum from the first open portion 230 of the intermediate stator 214 is communicated through the first open portion 240 of the outer shell roll 216 because the first open portion 240 of the outer shell roll 216 is aligned with the first open portion 230 of the intermediate stator 214. Thus, the vacuum from the interior chamber 220 is communicated to the first open portion 230 of the intermediate stator 214 and is communicated to the first open portion 240 of the outer shell roll 216 but remains blocked to the remaining open portions 241-249 of the outer shell roll 216.

Figure 18:
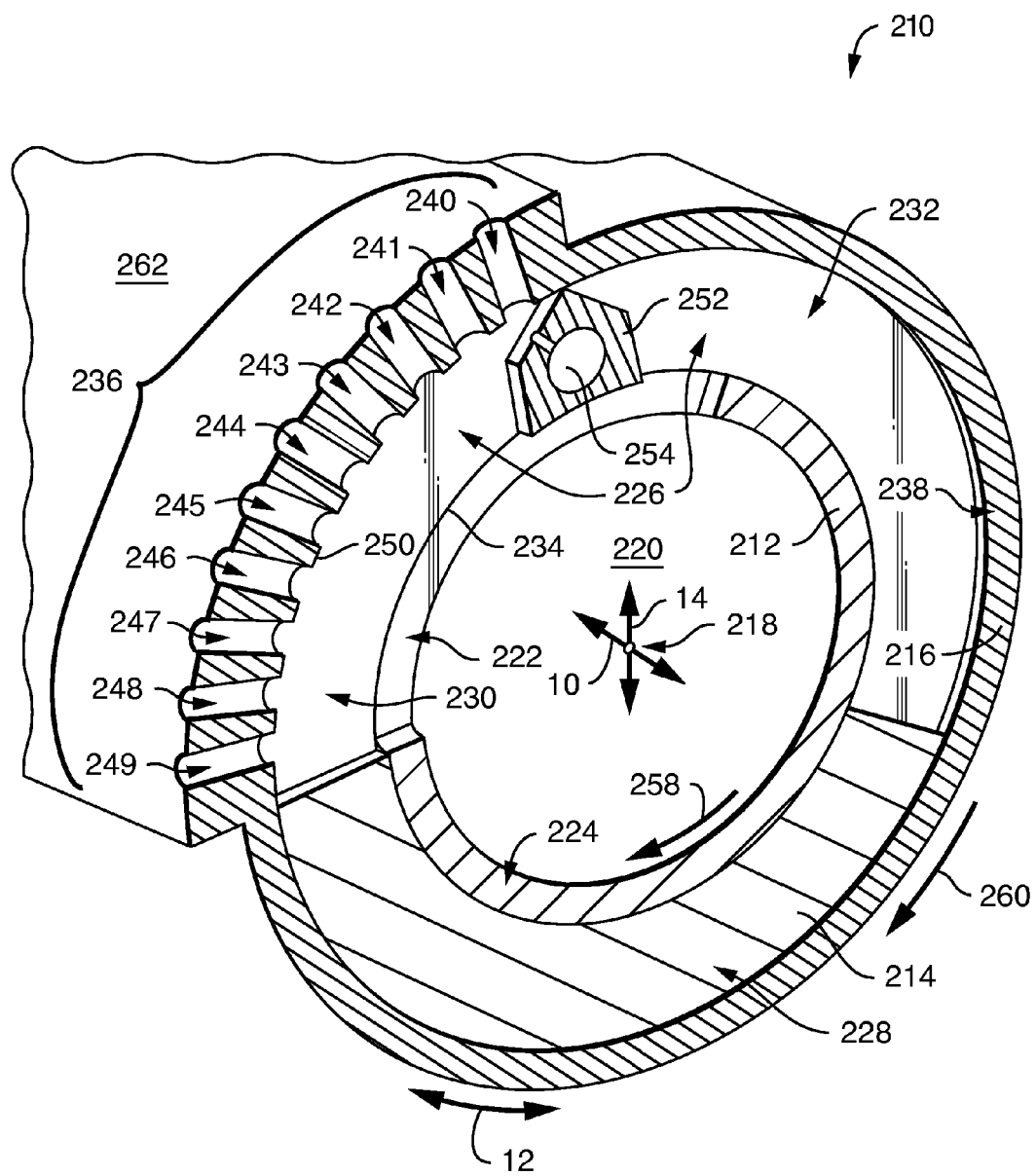

Referring now to FIG. 18, the vacuum roll 210 is illustrated with the inner rotor 212 still rotating about the common axis 218 in the first rotor direction 258. The vacuum from the interior chamber 220 continues to be communicated to the first open portion 230 of the intermediate stator 214 as the rotary valve interface 234 remains in the first valve ON condition. Additionally, the vacuum from the interior chamber 220 is now being communicated to the second open portion 232 of the intermediate stator 214 because the inner rotor 212 has rotated within the intermediate stator 214 to at least partially align the open portion 222 of the inner rotor 212 with the second open portion 232 of the intermediate stator 214 to define the rotary valve interface 234 in a second valve ON condition. The outer shell roll 216 continues to rotate about the common axis 218 in the first shell direction 260 to a third shell position. In this position and valve interface condition, the vacuum from the first open portion 230 of the intermediate stator 214 is being communicated through the plurality of open portions 240-249 of the outer shell roll 216. In some embodiments, the inner rotor and the outer shell roll may be rotating in the same direction and the open area of the inner rotor may "lead" the open area of the outer shell roll as illustrated in FIG. 18. This sequencing of rolls allows the second open portion 232 of the intermediate stator 214 to be evacuated before the open portion(s) of the shell roll align with the second open portion 232 and minimizes any lag in vacuum force available to the product surface 262.

Figure 19:
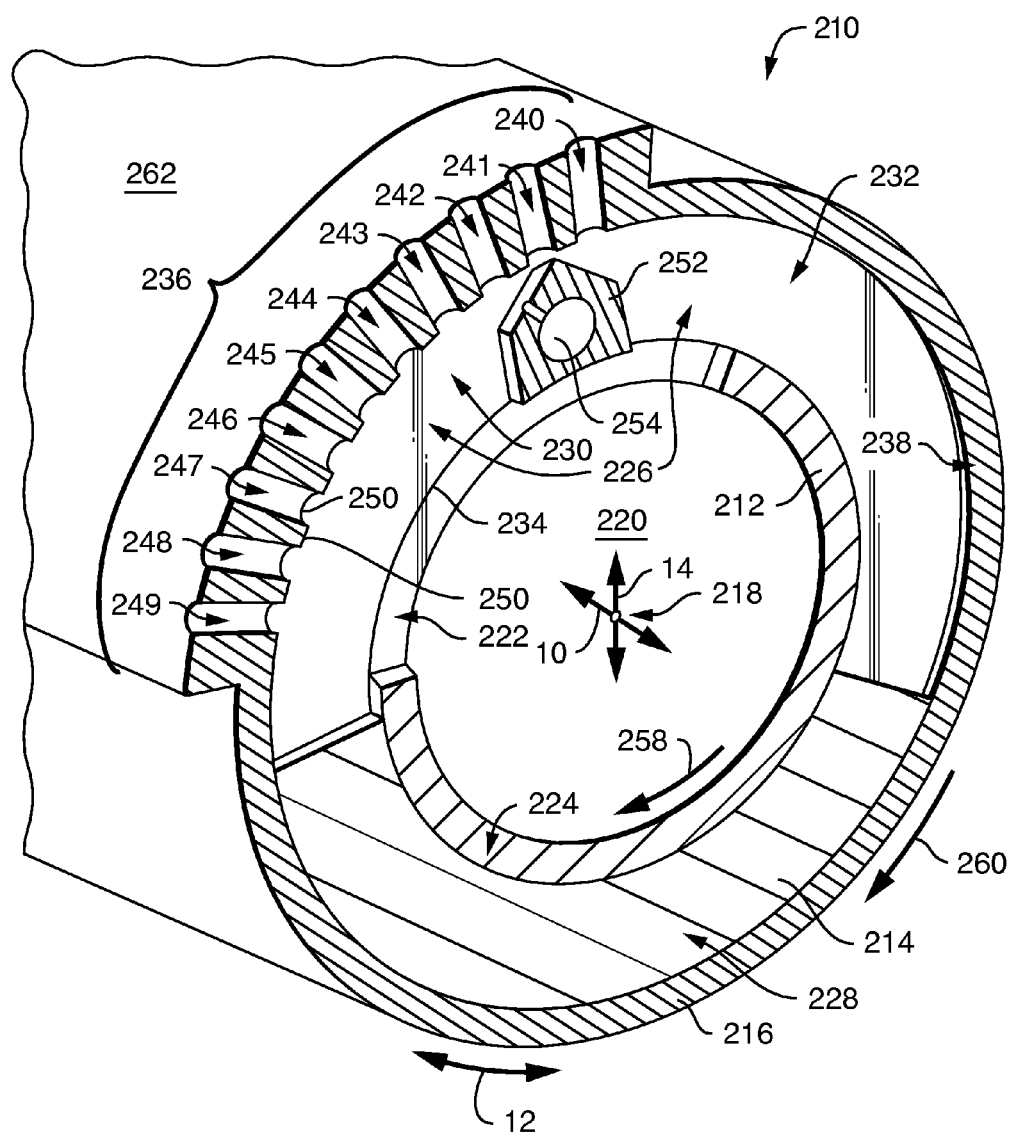

Referring now to FIG. 19, the vacuum roll 210 is illustrated with the inner rotor 212 still rotating about the common axis 218 in the first rotor direction 258. The vacuum from the interior chamber 220 is still being communicated to the first open portion 230 of the intermediate stator 214 because the rotary valve interface 234 is still in the first valve ON condition. Likewise, the vacuum from the interior chamber 220 continues to be communicated to the second open portion 232 of the intermediate stator 214 as the rotary valve interface 234 remains in the second valve ON condition. The outer shell roll 216 continues to rotate about the common axis 218 in the first shell direction 260 to a fourth shell position. In this position and valve interface condition, the vacuum from the first open portion 230 of the intermediate stator 214 is being communicated through the plurality of open portions 242-249 of the outer shell roll 216 and the vacuum from the second open portion 232 of the intermediate stator 214 is being communicated through the open portions 240-241 of the outer shell roll 216.

Figure 20:
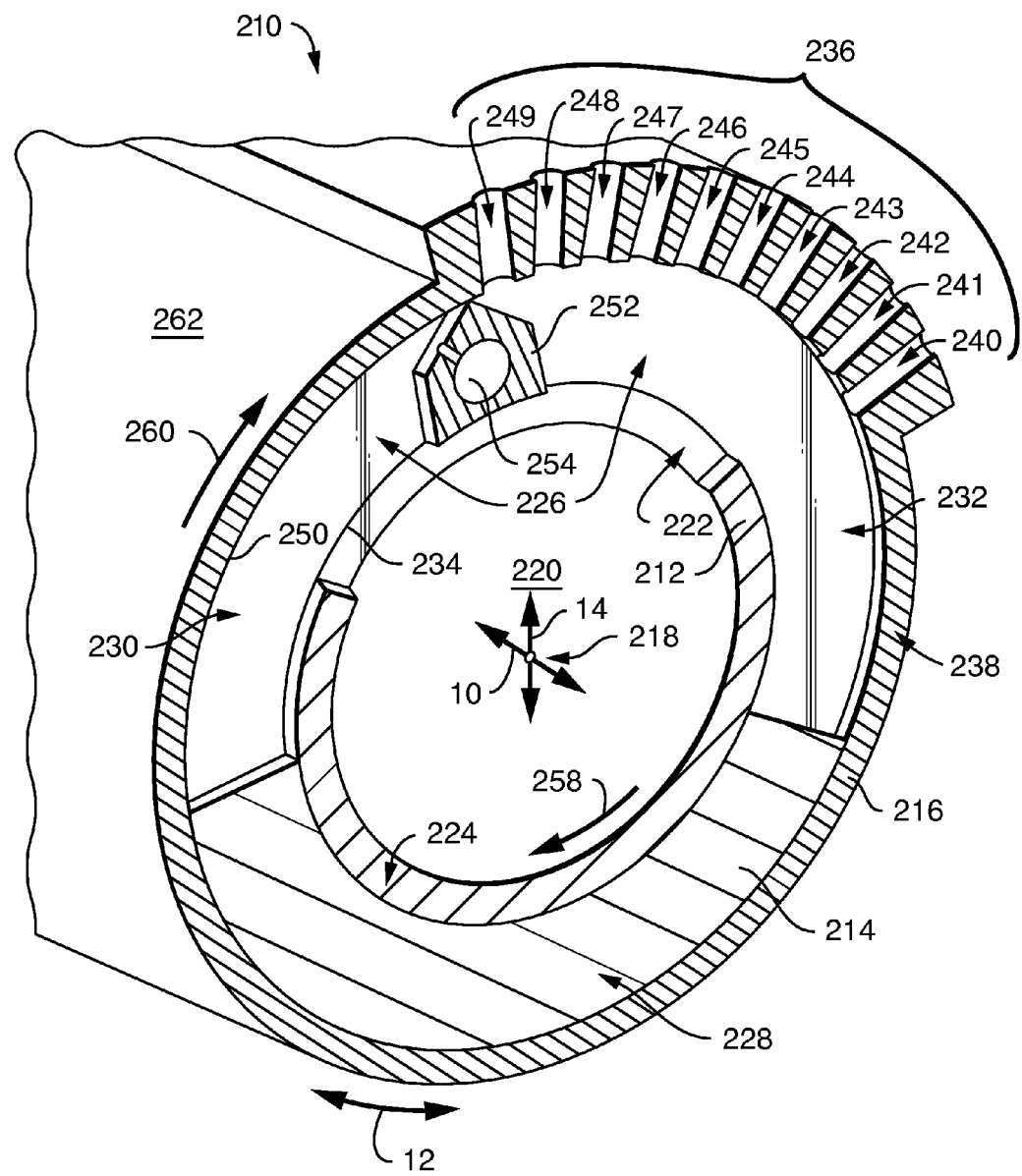

Referring now to FIG. 20, the vacuum roll 210 is illustrated with the inner rotor 212 continuing to rotate about the common axis 218 in the first rotor direction 258. The vacuum from the interior chamber 220 continues to be communicated to the first open portion 230 of the intermediate stator 214 as the rotary valve interface 234 is still in the first valve ON condition. Likewise, the vacuum from the interior chamber 220 continues to be communicated to the second open portion 232 of the intermediate stator 214 as the rotary valve interface 234 is still in the second valve ON condition. The outer shell roll 216 continues to rotate about the common axis 218 in the first shell direction 260 to a fifth shell position. In this position and valve interface condition, the vacuum from the first open portion 230 of the intermediate stator 214 is blocked to the product surface 262 of the outer shell roll 216 and the vacuum from the second open portion 232 of the intermediate stator 214 continues to be communicated through the plurality of open portions 240-249 of the outer shell roll 216.

Figure 21:
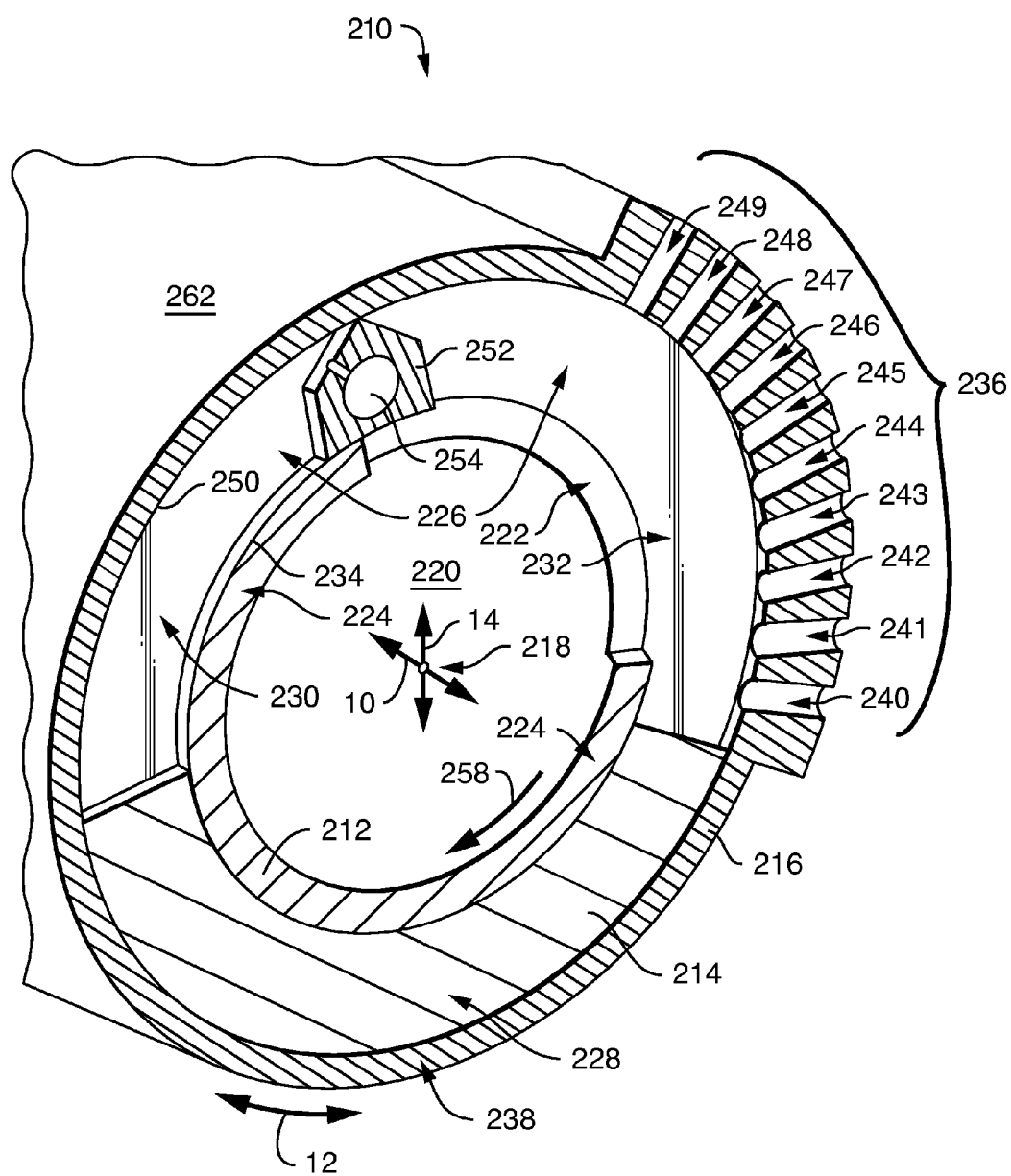

Referring now to FIG. 21, the vacuum roll 210 is illustrated with the inner rotor 212 continuing to rotate about the common axis 218 in the first rotor direction 258. The vacuum from the interior chamber 220 is now blocked to the first open portion 230 of the intermediate stator 214 by complete alignment of the closed portion 224 of the inner rotor 212 with the first open portion 230 of the intermediate stator 214 to define the rotary valve interface 234 in a first valve OFF condition. The vacuum from the interior chamber 220 continues to be communicated to the second open portion 232 of the intermediate stator 214 as the rotary valve interface 234 remains in the second valve ON condition. The outer shell roll 216 has stopped rotating about the common axis 218 at this sixth shell position. In this position and valve interface condition, the vacuum to and from the first open portion 230 of the intermediate stator 214 is blocked and the vacuum through the second open portion 232 of the intermediate stator 214 continues to be communicated through the plurality of open portions 240-249 of the outer shell roll 216.

Figure 22:
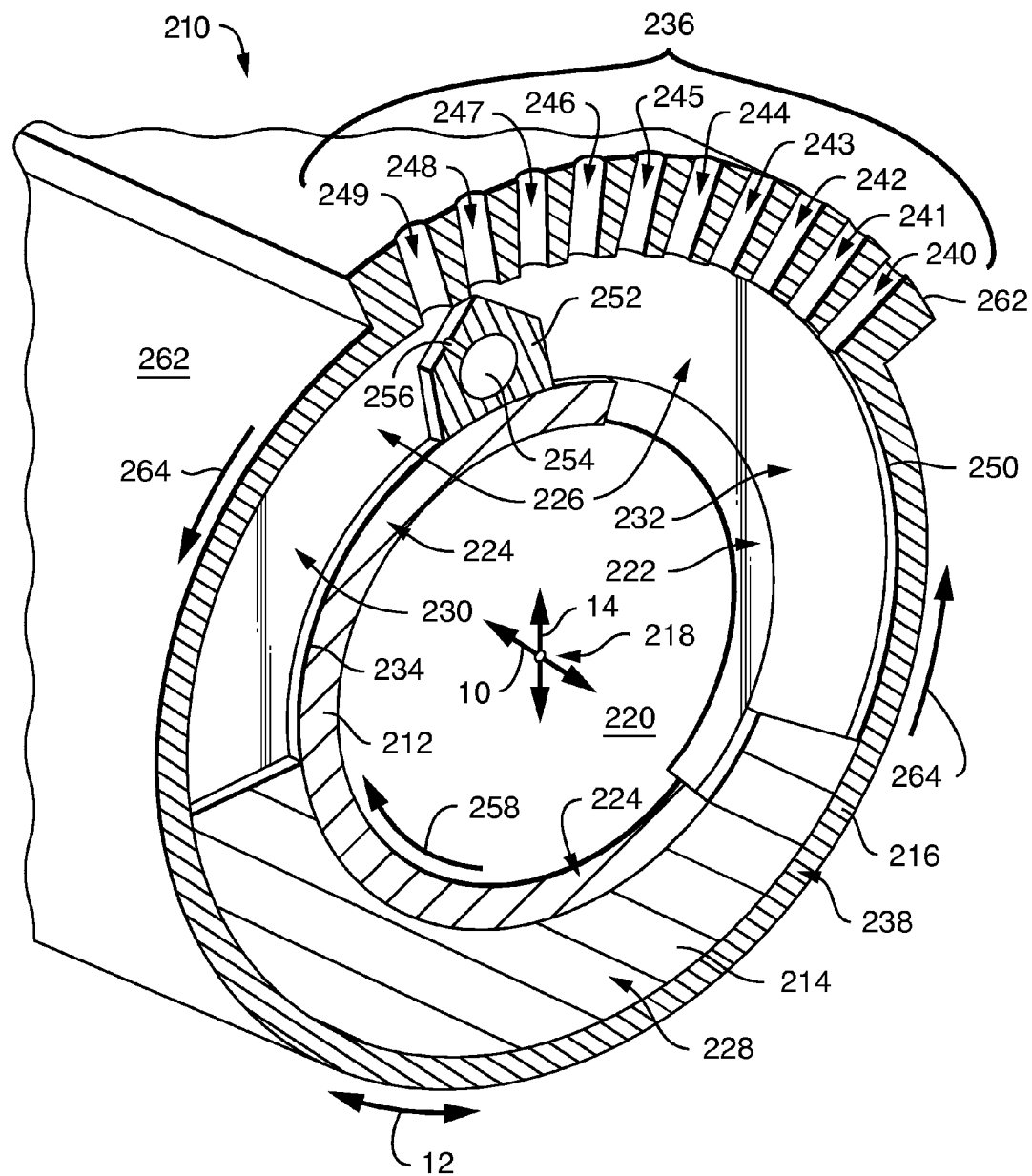

Referring now to FIG. 22, the vacuum roll 210 is illustrated with the inner rotor 212 continuing to rotate about the common axis 218 in the first rotor direction 258. The vacuum from the interior chamber 220 remains blocked from the first open portion 230 of the intermediate stator 214 as the rotary valve interface 234 is in the first valve OFF condition. The vacuum from the interior chamber 220 continues to be communicated to the second open portion 232 of the intermediate stator 214 as the rotary valve interface 234 is still in the second valve ON condition. The outer shell roll 216 is now rotating about the common axis 218 in a second shell direction 264. The second shell direction 264 is opposite the first shell direction 260. In this position and valve interface condition, the vacuum to the first open portion 230 of the intermediate stator 214 is blocked. Thus, the vacuum to the last open portion 249 of the outer shell roll 216 is blocked while the vacuum from the second open portion 232 of the intermediate stator 214 continues to be communicated through the plurality of open portions 240-248 of the outer shell roll 216.

Figure 23:
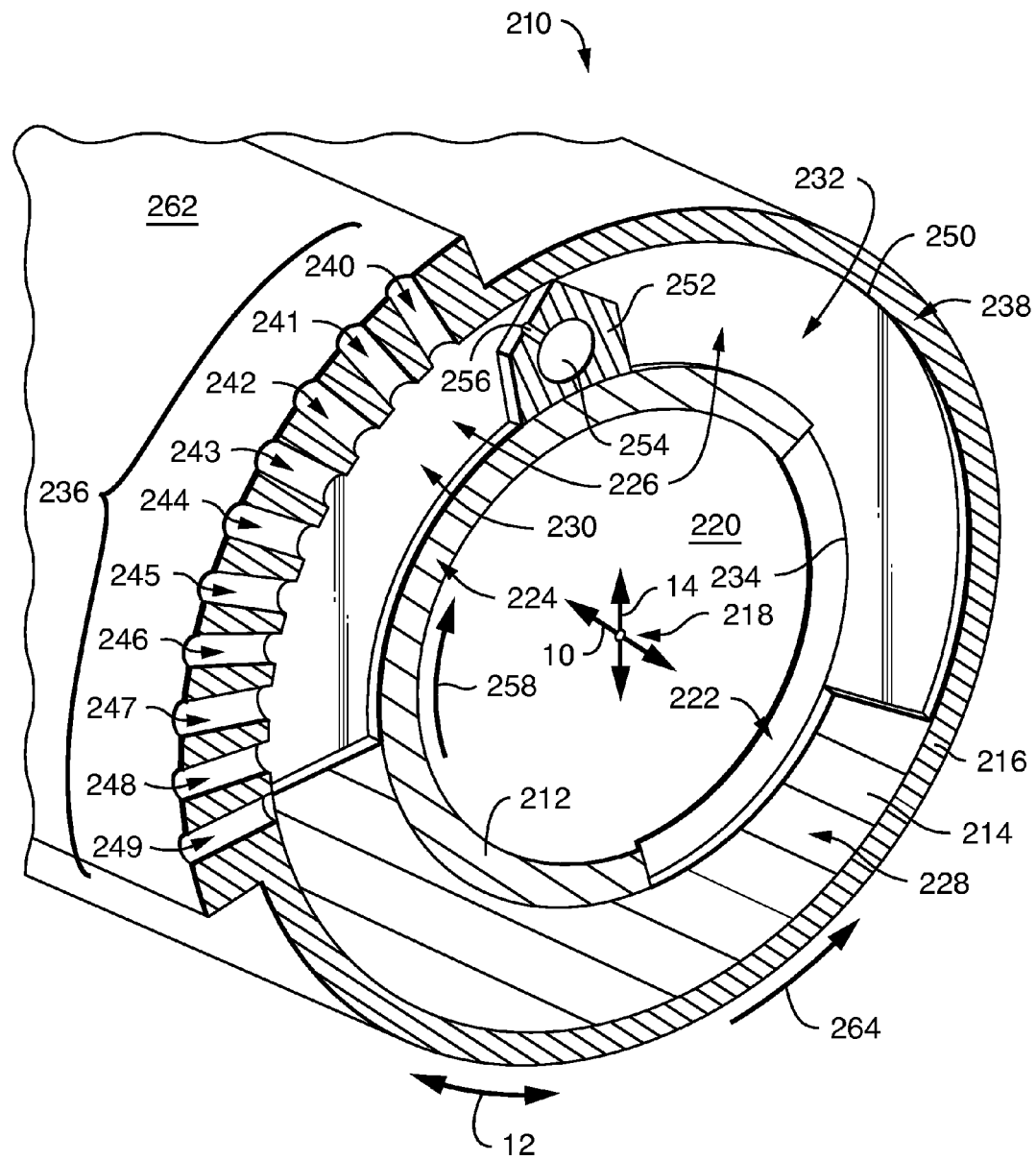

Referring now to FIG. 23, the vacuum roll 210 is illustrated with the inner rotor 212 continuing to rotate about the common axis 218 in the first rotor direction 258. The vacuum from the interior chamber 220 remains blocked to the first open portion 230 of the intermediate stator 214 as the rotary valve interface 234 is in the first valve OFF condition. The vacuum from the interior chamber 220 continues to be communicated to the second open portion 232 of the intermediate stator 214 as the rotary valve interface 234 is still in the second valve ON condition. The outer shell roll 216 is now rotating about the common axis 218 in the second shell direction 264. In this position and valve interface condition, the vacuum to the first open portion 230 of the intermediate stator 214 is blocked. Thus, the vacuum to the open portions 240-249 is also blocked.

In some embodiments, fluid pressure may be applied to the first open portion and/or the second open portion of the intermediate stator to assist in the release of a material from the product surface. In some embodiments, fluid pressure may be applied to the first open portion and/or the second open portion of the intermediate stator while vacuum is blocked from said first and/or second open portion of the intermediate stator to assist in the release of a material from the product surface. Alternatively or additionally, fluid pressure may be applied to all or a part of the open portion of the outer shell. In some embodiments, fluid pressure may be applied to the first open portion of the intermediate stator while vacuum is blocked from said first portion of the intermediate stator and while vacuum is communicated through the second portion of the intermediate stator. This configuration may assist in the release of a material from a portion of the product surface while maintaining the hold of the material in a second portion of the product surface. In various embodiments, fluid pressure may be applied directly to all or part of the open portion of the outer shell.

For example, in the shell position and valve interface condition illustrated in FIG. 22, fluid pressure may be applied from the second fluid supply line 254 to the first open portion 230 of the intermediate stator 214 via the blow off 256. Since the vacuum from the interior chamber 220 is blocked to the first open portion 230 of the intermediate stator 214, the fluid pressure may be communicated through the open portion 249 of the outer shell roll 216. Simultaneously, since the vacuum from the interior chamber 220 is communicated to the second open portion 232 of the intermediate stator 214, the vacuum may be communicated through the open portions 240-248 of the outer shell roll 216. Applying pressure in this manner may assist in removing a product from a first portion of the product surface 262 while maintaining hold of the product to a second portion of the product surface 262.

In another example, in the shell position and valve interface condition illustrated in FIG. 23, fluid pressure may be applied from the second fluid supply line 254 to the first open portion 230 of the intermediate stator 214 via the blow off 256. Since the vacuum from the interior chamber 220 is blocked to the first open portion 230 of the intermediate stator 214, the fluid pressure may be communicated through the open portion 236 of the outer shell roll 216. Applying pressure in this manner may assist in complete removal of the product from the product surface 262.

In general, the method and apparatus of the present invention enables the product surface 262 of the outer shell roll 216 to have vacuum communicated thereto when aligned with the first open portion 230 of the intermediate stator 214 while the outer shell roll 216 is moving in the first shell direction 260. Additionally, the method and apparatus of the present invention enables the product surface 262 to also have vacuum blocked thereto when aligned with the first open portion 230 of the intermediate stator 214 while the outer shell roll 216 is moving in the second shell direction 264. In some embodiments, the method and apparatus of the present invention also enables the product surface 262 to have fluid pressure communicated thereto when aligned with the first open portion 230 of the intermediate stator 214 while the outer shell roll 216 is moving in the second shell direction 264.

In various embodiments, the sequence of steps illustrated in FIGS. 16-23 may be repeated one or more times in an ongoing method of creating a circumferential vacuum profile. Specifically, the repetitive sequence of the steps illustrated in FIGS. 16-23 results in the inner rotor 212 continuously rotating in a first rotor direction 258 while the outer shell roll 216 alternates between rotation in a first shell direction 260 and a second shell direction 264 to create an oscillating motion. The rotation of the inner rotor 212 operates to alternatingly transition the rotary valve interface 234 between a first valve ON condition and a first valve OFF condition. Likewise, the rotation of the inner rotor 212 operates to alternatingly transition the rotary valve interface between a second valve ON condition and a second valve OFF condition. In some embodiments, the rotation of the inner rotor 212 operates to create a repeating sequence wherein: first, the rotary valve interface is in first valve ON condition and the second valve OFF condition; second, the rotary valve interface is in the first valve ON condition while also in the second valve ON condition; third, the rotary valve interface is in the first valve OFF condition while also in the second valve ON condition; and fourth, the rotary valve interface is in the first valve OFF condition while also in the second valve OFF condition.

While the invention has been described in detail with respect to specific embodiments thereof, it will be appreciated that those skilled in the art, upon attaining understanding of the foregoing will readily appreciate alterations to, variations of, and equivalents to these embodiments. Accordingly, the scope of the present invention should be assessed as that of the appended claims and any equivalents thereto. Additionally, all combinations and/or sub-combinations of the disclosed embodiments, ranges, examples, and alternatives are also contemplated.

The invention claimed is:
1. A vacuum roll comprising,
an inner rotor, an intermediate stator, and an outer shell roll, wherein
the inner rotor is adapted to rotate around a first axis and defines an interior chamber, an open portion, and a closed portion, in a circumferential direction,
the intermediate stator is rotationally fixed and has a second axis and surrounds the inner rotor, the intermediate stator defines an open portion and a closed portion in the circumferential direction,
the outer shell roll is adapted to move about a third axis and surrounds the intermediate stator, the outer shell roll defines an open portion and a closed portion in the circumferential direction, and together the inner rotor and the intermediate stator define an internal rotary valve interface adapted to control fluid communication between the interior chamber and the outer shell roll.

2. The vacuum roll of claim 1 wherein the inner rotor, the intermediate stator, and the outer shell roll are concentric and have a common axis.

3. The vacuum roll of claim 1 wherein the open portion of the intermediate stator defines a first open portion and a second open portion, in the circumferential direction, wherein the first open portion is adapted for fluid isolation from the second open portion.

4. The vacuum roll of claim 3 wherein the open portion of the inner rotor comprises a plurality of sub-openings extending in an axial direction, the first open portion of the intermediate stator comprises a plurality of sub-openings extending in the axial direction, the second open portion of the intermediate stator comprises a plurality of sub-openings extending in the axial direction, and the open portion of the outer shell roll comprises a plurality of sub-openings extending in the axial direction.

5. The vacuum roll of claim 4 wherein a single inner rotor sub-opening is adapted to align, in the axial direction, with a single sub-opening of the first open portion of the intermediate stator, a single sub-opening of the second open portion of the intermediate stator, and a pair of sub-openings of the outer shell roll.

6. The vacuum roll of claim 3 wherein the first open portion of the intermediate stator is separated from the second open portion of the intermediate stator by a divider that includes a positive pressure blow off.

7. The vacuum roll of claim 3 wherein the intermediate stator defines an internal surface and an external surface and wherein the closed portion defines an internal surface closed percentage and an external surface closed percentage that is less than the internal surface closed percentage.

8. The vacuum roll of claim 1 wherein the inner rotor is connected with a first drive mechanism for rotating the inner rotor at a constant velocity and the outer shell roll is connected with a second drive mechanism, different than the first drive mechanism, that is adapted to co-rotate, counter-rotate, or oscillate the outer shell with respect to the inner rotor rotation.

9. The vacuum roll of claim 1 wherein the inner rotor is connected with a drive mechanism for rotating the inner rotor at a non-constant velocity.

10. The vacuum roll of claim 1 wherein the radial clearance between the outer shell roll and the intermediate stator is less than 0.010 inch and the radial clearance between the intermediate stator and the outer shell roll is less than 0.010 inch.

11. The vacuum roll of claim 1 wherein the interior chamber is connected to a vacuum source ported in a radial direction relative to the first axis.

12. A method for creating a circumferential vacuum profile in a vacuum roll comprising,
providing a vacuum roll having an inner rotor, an intermediate stator, and an outer shell roll, wherein,
the inner rotor is adapted to rotate about a first axis, defines an interior chamber and also defines an open portion and a closed portion in the circumferential direction,
the intermediate stator is rotationally fixed and has a second axis, surrounds the inner rotor, and defines an open portion and a closed portion in the circumferential direction, and
the outer shell roll is adapted to move about a third axis, surrounds the intermediate stator, and defines an open portion and a closed portion in the circumferential direction;
applying vacuum to the interior chamber;
communicating vacuum from the interior chamber to the open portion of the outer shell roll by moving the outer shell roll around the intermediate stator to at least partially align the open portion of the outer shell roll with the open portion of the intermediate stator while also rotating the inner rotor within the intermediate stator to at least partially align the open portion of the inner rotor with the open portion of the intermediate stator,
blocking vacuum from the interior chamber to the open portion of the outer shell roll by rotating the inner rotor within the intermediate stator to completely align the closed portion of the inner rotor with the open portion of the intermediate stator or rotating the outer shell roll around the intermediate stator to completely align the open portion of the outer shell roll with the closed portion of the intermediate stator.

13. The method of claim 12 wherein the open portion of the intermediate stator defines a first open portion and a second open portion in the circumferential direction and wherein the method includes
applying vacuum to the first open portion of the intermediate stator,
applying vacuum to the second open portion of the intermediate stator while continuing to apply vacuum to the first open portion of the intermediate stator, and
blocking vacuum to the first open portion of the intermediate stator while simultaneously applying fluid pressure to the first open portion of the stator and simultaneously applying vacuum to the second open portion of the intermediate stator.

14. The method of claim 12 further comprising
oscillating the outer shell roll by alternatingly and repetitively moving the outer shell roll in a first direction and a second direction, wherein the first direction is opposite the second direction.

15. The method of claim 14 further comprising,
applying vacuum to the open portion of the outer shell roll in a first position while moving in the first direction, and
blocking vacuum to the open portion of the outer shell roll in the first position while moving in the second direction.

16. A method for creating a circumferential vacuum profile in a vacuum roll comprising,
providing a vacuum roll having an inner rotor, an intermediate stator, and an outer shell roll, wherein,
the inner rotor rotates about a common axis, defines an interior chamber and also defines an open portion and a closed portion in the circumferential direction,
the intermediate stator is rotationally fixed about the common axis, surrounds the inner rotor, and defines a first open portion, a second open portion, and a closed portion in the circumferential direction, and
the outer shell roll rotates about the common axis, surrounds the intermediate stator, and defines an open portion and a closed portion in the circumferential direction;
applying vacuum to the interior chamber;
communicating vacuum from the interior chamber to the first open portion of the intermediate stator by rotating the inner rotor within the intermediate stator to at least partially align the open portion of the inner rotor with the first open portion of the intermediate stator to define a first valve ON condition;

blocking vacuum from the interior chamber to the first open portion of the intermediate stator by rotating the inner rotor within the intermediate stator to completely align the closed portion of the inner rotor with the first open portion of the intermediate stator to define a first valve OFF condition;

communicating vacuum from the interior chamber to the second open portion of the intermediate stator by rotating the inner rotor within the intermediate stator to at least partially align the open portion of the inner rotor with the second open portion of the intermediate stator to define a second valve ON condition;

blocking vacuum from the interior chamber to the second open portion of the intermediate stator by rotating the inner rotor within the intermediate stator to completely align the closed portion of the inner rotor with the second open portion of the intermediate stator to define a second valve OFF condition;

blocking vacuum from the interior chamber to the open portion of the outer shell roll by completely aligning the open portion of the outer shell roll with the closed portion of the intermediate stator to define a first shell position;

communicating vacuum from the interior chamber to the open portion of the outer shell roll by moving the outer shell roll around the intermediate stator in a first direction to at least partially align the open portion of the outer shell roll with the first open portion of the intermediate stator to define a second shell position while in the first valve ON condition;

communicating vacuum from the interior chamber to the open portion of the outer shell roll by moving the outer shell roll around the intermediate stator in the first direction to at least partially align the open portion of the outer shell roll with the second open portion of the intermediate stator to define a third shell position while in the second valve ON condition;

communicating vacuum from the interior chamber to the open portion of the outer shell roll by moving the outer shell roll around the intermediate stator in a second direction, opposite the first direction, to the third shell position while in the second valve ON condition;

blocking vacuum from the interior chamber to the open portion of the outer shell roll by moving the outer shell roll around the intermediate stator in the second direction to the second shell position while in the first valve OFF condition.

17. The method of claim 16 further comprising applying fluid pressure to the first open portion of the intermediate stator while in the first valve OFF condition and while in the second valve ON condition.

* * * * *